(12) United States Patent
Single et al.

(10) Patent No.: US 12,533,518 B2
(45) Date of Patent: Jan. 27, 2026

(54) HYBRID FEEDBACK LOOP CONTROL OF NEUROMODULATION DEVICE

(71) Applicant: Saluda Medical Pty Ltd, Level 1 (AU)

(72) Inventors: Peter Scott Vallack Single, Artarmon (AU); Joanne Carol Shiels Olecko, Pleasanton, CA (US); Robert Bruce Gorman, Artarmon (AU); James Hamilton Wah, Artarmon (AU)

(73) Assignee: Saluda Medical Pty Ltd, Macquarie Park (AU)

( * ) Notice: Subject to any disclaimer, the term of this patent is extended or adjusted under 35 U.S.C. 154(b) by 288 days.

(21) Appl. No.: 18/042,777

(22) PCT Filed: Aug. 27, 2021

(86) PCT No.: PCT/AU2021/050994
§ 371 (c)(1),
(2) Date: Feb. 24, 2023

(87) PCT Pub. No.: WO2022/040754
PCT Pub. Date: Mar. 3, 2022

(65) Prior Publication Data
US 2023/0310867 A1  Oct. 5, 2023

(30) Foreign Application Priority Data

Aug. 28, 2020 (AU) ............................... 2020903091
Aug. 28, 2020 (AU) ............................... 2020903095

(51) Int. Cl.
*A61N 1/36* (2006.01)
*A61N 1/05* (2006.01)

(52) U.S. Cl.
CPC ....... *A61N 1/36157* (2013.01); *A61N 1/0551* (2013.01); *A61N 1/36139* (2013.01); *A61N 1/3614* (2017.08)

(58) Field of Classification Search
None
See application file for complete search history.

(56) References Cited

U.S. PATENT DOCUMENTS 7,450,992 B1   11/2008  Cameron
9,381,356 B2   7/2016   Parker et al.
(Continued)

FOREIGN PATENT DOCUMENTS

WO   WO 2018/080753 A1   5/2018
WO   WO 2020/082126 A1   4/2020

OTHER PUBLICATIONS

International Search Report and Written Opinion in PCT/AU2021/050993 dated Nov. 12, 2021, 14 pages.

*Primary Examiner* — Carl H Layno
*Assistant Examiner* — Bryan Mcallister Lee
(74) *Attorney, Agent, or Firm* — Barnes & Thornburg LLP

(57) ABSTRACT

A method of controlling a neural stimulus, the neural stimulus being defined by at least one stimulus intensity parameter. The method comprises, generating a stimulus intensity parameter to control a stimulator that generates a stimulus current for application to a tissue, measuring a response of the tissue, evoked by the stimulus current, determining a response parameter indicative of the measured response, in response to the response parameter being less than a first threshold, setting the stimulus intensity parameter to a desired stimulus intensity level; and in response to the response parameter being greater than a second threshold, adjust the stimulus intensity parameter according to a feedback variable derived from the measured response.

24 Claims, 18 Drawing Sheets

(56) References Cited

U.S. PATENT DOCUMENTS

| | | |
|---|---|---|
| 10,500,399 B2 | 12/2019 | Single |
| 2014/0277282 A1* | 9/2014 | Jaax .................. A61N 1/36139 607/59 |
| 2019/0388692 A1* | 12/2019 | Dinsmoor .......... A61N 1/36153 |

* cited by examiner

HYBRID FEEDBACK LOOP CONTROL OF NEUROMODULATION DEVICE

CROSS-REFERENCE TO RELATED APPLICATIONS

The present application is a U.S. National Stage Patent Application of PCT Patent Application No. PCT/AU2021/050994, filed on Aug. 27, 2021 which claims priority from Australian Provisional Patent Application No. 2020903091 filed on Aug. 28, 2020 and Australian Provisional Patent Application No. 2020903095 filed on Aug. 28, 2020, the contents of which are incorporated herein by reference in their entirety.

TECHNICAL FIELD

The present invention relates to controlling a neural response to a stimulus, and in particular relates to measurement of a compound action potential by using one or more electrodes implanted near a neural pathway, in order to provide feedback to control subsequently applied stimuli.

BACKGROUND

There is a range of situations in which it is desirable to apply neural stimuli in order to give rise to a compound action potential (CAP) in a tissue. For example, neuromodulation is used to treat a variety of disorders including chronic pain, Parkinson's disease, and migraine. A neuromodulation system applies an electrical pulse to tissue in order to generate a therapeutic effect. When used to relieve chronic pain, the electrical pulse is applied to the dorsal column (DC) of the spinal cord. Such a system typically comprises an implanted electrical pulse generator, and a power source such as a battery that may be rechargeable by transcutaneous inductive transfer. An electrode array is connected to the pulse generator, and is positioned in the dorsal epidural space above the dorsal column. The electrode array applies an electrical pulse to the dorsal column, which causes the depolarisation of neurons, and generation of propagating action potentials. This stimulates the nerve fibres and, as a result, inhibits the transmission of pain from that segment in the spinal cord to the brain. The electrode array applies stimuli continuously to sustain the pain relief effects. Neuromodulation may also be used to stimulate efferent fibres, for example to induce motor functions.

In general, the electrical stimulus generated in a neuromodulation system triggers a neural action potential which then has either an inhibitory or excitatory effect. Inhibitory effects can be used to modulate an undesired process such as the transmission of pain, or to cause a desired effect such as the contraction of a muscle.

The action potentials generated among a large number of fibres sum to form an electrically evoked compound action potential (ECAP). Accordingly, an ECAP is the sum of responses from a large number of single fibre action potentials. The ECAP recorded is the result of a large number of different fibres depolarising. The ECAP generated from the firing of a group of similar fibres is measured as a positive peak potential, then a negative peak, followed by a second positive peak. This is caused by the region of activation passing a recording electrode as the action potentials propagate along the individual fibres.

For effective and comfortable operation, it is desirable to maintain an electrical stimulus above a recruitment threshold, below which the electrical stimulus will fail to recruit any neural response and the patient will be unable to perceive an effect. It is also desirable to maintain an electrical stimulus which is below a comfort threshold, above which uncomfortable or painful percepts arise due to increasing recruitment of Aδ fibres, which are thinly myelinated sensory nerve fibres associated with acute pain, cold and pressure sensation.

The stimuli can be delivered within a therapeutic range (above the recruitment threshold and below the comfort threshold) by adjusting the amplitude of applied stimulus based on a feedback signal. The feedback signal is based on a measured ECAP value, detected by an electrode connected to the nerve fibres upstream of the stimulating electrode. Based on the ECAP value, the amplitude of the applied stimulus can be adjusted to maintain the nerve stimulus amplitude within the therapeutic range. A method for achieving this is disclosed in U.S. Pat. No. 9,381,356 B2, and U.S. Pat. No. 10,500,399 B2 the contents of which is hereby incorporated.

The task of maintaining appropriate stimulus amplitude is made more difficult by electrode migration and/or postural changes of the implant recipient (patient), either of which can significantly alter the neural recruitment arising from a given stimulus, depending on whether the stimulus is applied before or after the change in electrode position or patient posture. Postural changes alone can cause a comfortable and effective stimulus regime to become either ineffectual or painful. Furthermore, it is often desirable to maintain stimulation at, or close to, a target stimulation level, within a therapeutic range.

Accordingly, it is desirable to provide a neural stimulation device that can maintain stimulation at, or close to, a target stimulation level, even in the event of electrode movement and/or postural changes of the patient.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word 'comprise', or variations such as 'comprises' or 'comprising', will be understood to imply the inclusion of a stated element, integer or step, or group of elements, integers or steps, but not the exclusion of any other element, integer or step, or group of elements, integers or steps.

SUMMARY

There is provided a method of controlling a neural stimulus, the neural stimulus being defined by at least one stimulus intensity parameter. The method comprises, generating a stimulus intensity parameter to control a stimulator that generates a stimulus current for application to a tissue, measuring a response of the tissue, evoked by the stimulus current, determining a response parameter indicative of the measured response, in response to the response parameter being less than a first threshold, setting the stimulus intensity parameter to a desired stimulus intensity level; and in response to the response parameter being greater than a second threshold, adjust the stimulus intensity parameter according to a feedback variable derived from the measured response.

In one embodiment, the desired stimulus intensity level is configured by a user. In one embodiment, setting the stimulus intensity parameter to the desired stimulus intensity level comprises determining a present stimulus intensity parameter of the neural stimulus and setting the stimulus intensity level to the present stimulus intensity parameter.

In one embodiment, setting the stimulus intensity parameter to a desired stimulus intensity level comprises iteratively adjusting the stimulus intensity parameter to the desired stimulus intensity level in increments. In one embodiment, the first threshold is equal to the second threshold. In one embodiment, the first threshold and the second threshold represent a level of electrically evoked compound action potential of the tissue. In one embodiment, the first threshold and the second threshold are determined based on the stimulus intensity level at an ECAP threshold. In one embodiment, the response parameter is a function of a plurality of measured response values determined over a time period.

In one embodiment, the method further comprises storing the stimulus intensity parameter in non-volatile memory, and in response to the neural stimulus turning on, setting the stimulus intensity parameter to the stored stimulus intensity parameter.

In one embodiment, the method further comprises determining an artefact compensation parameter based on an artefact component of the measured response of the tissue, and adjusting the measured response based on the artefact compensation parameter. In one embodiment, the method further comprises determining the artefact component based on the stimulus intensity parameter.

In one embodiment, configuring the stimulus intensity parameter according to a feedback variable derived from the measured response comprises, in response to the measured response being greater than a target value, reducing the stimulus intensity parameter in accordance with a reduction rate, and in response to the measured response being less than the target value, increasing the stimulus intensity parameter in accordance with a growth rate, wherein the magnitude of the reduction rate being not equal to the magnitude of the growth rate. In one embodiment, the method further comprising determining the reduction rate based on a duration of time for which the measured response is greater than the target value.

There is further provided an implantable device for controllably applying a neural stimulus defined by at least one stimulus intensity parameter. The device comprises one or more stimulus electrodes to deliver stimulus to a tissue to evoke a compound action potential response of the tissue, a stimulator for controlling the one or more stimulus electrodes in accordance with the at least one stimulus intensity parameter, measurement circuitry for measuring the evoked compound action potential response of the tissue, and a control unit configured to, generate the stimulus intensity parameter, measure the response of the tissue, evoked by the stimulus current, determine a response parameter indicative of the measured response, in response to the response parameter being less than a first threshold, set the stimulus intensity parameter to a desired stimulus intensity level, and in response to the response parameter being greater than a second threshold, configure the stimulus intensity parameter according to a feedback parameter derived from the measured response.

In one embodiment, the device further comprises an input for configuring the desired stimulus intensity level.

There is further provided a method of controlling a neural stimulus, the neural stimulus being defined by at least one stimulus intensity parameter. The method comprises generating a stimulus intensity parameter to control a stimulator that generates a stimulus current for application to a tissue, measuring a response of the tissue, evoked by the stimulus current, determining an artefact compensation component as a function of the stimulus intensity parameter and indicative of an artefact component of the measured response, and adjusting the stimulus intensity parameter according to a feedback parameter derived from the measured response and the artefact compensation component.

In one embodiment, the method further comprises adjusting the measured response based on the artefact compensation component, to produce an adjusted response, and wherein, adjusting the stimulus intensity parameter comprises adjusting the stimulus intensity parameter according to a feedback parameter derived from the adjusted response.

In one embodiment, determining the artefact component comprises determining the artefact component based the stimulus intensity parameter. In one embodiment, the artefact compensation component is the same magnitude as the artefact component, and of opposite sign to the artefact component. In one embodiment, the artefact compensation component includes a fixed offset to compensate for a component of the artefact that is not based on the stimulus current.

There is further provided an implantable device for controllably applying a neural stimulus defined by at least one stimulus intensity parameter. The device comprises one or more stimulus electrodes to deliver stimulus to a tissue to evoke a compound action potential response of the tissue, a stimulator for controlling the one or more stimulus electrodes in accordance with the at least one stimulus intensity parameter, measurement circuitry for measuring the evoked compound action potential response of the tissue, and a control unit. The control unit is configured to generate the stimulus intensity parameter, measure the response of the tissue, evoked by the stimulus current, determine an artefact compensation component as a function of the stimulus intensity parameter and indicative of an artefact component of the measured response, and adjust the stimulus intensity parameter according to a feedback parameter derived from the measured response and the artefact compensation component.

There is further provided a method of controlling a neural stimulus, the neural stimulus being defined by at least one stimulus intensity parameter. The method comprises generating a stimulus intensity parameter to control a stimulator that generates a stimulus current for application to a tissue, measuring a response of the tissue evoked by the stimulus current, in response to the measured response being greater than a target value, reducing the stimulus intensity parameter in accordance with a reduction rate, and in response to the measured response being less than the target value, increasing the stimulus intensity parameter in accordance with a growth rate, wherein the magnitude of the reduction rate is not equal to the magnitude of the growth rate.

In one embodiment, the method further comprises determining the reduction rate based on a duration of time for which the measured response is greater than the target value. In one embodiment, the duration of time for which the measured response is greater than the target value is determined by an integrator.

There is further provided an implantable device for controllably applying a neural stimulus defined by at least one stimulus intensity parameter. The device comprises one or more stimulus electrodes to deliver stimulus to a tissue to evoke a compound action potential response of the tissue, a stimulator for controlling the one or more stimulus electrodes in accordance with the at least one stimulus intensity parameter, measurement circuitry for measuring the evoked compound action potential response of the tissue, and a control unit. The control unit is configured to generate the stimulus intensity parameter, measure the response of the tissue, evoked by the stimulus current, in response to the measured response being greater than a target value, reduce the stimulus intensity parameter in accordance with a reduction rate, and in response to the measured response being less than the target value, increase the stimulus intensity parameter in accordance with a growth rate, wherein the magnitude of the reduction rate is not equal to the magnitude of the growth rate.

BRIEF DESCRIPTION OF DRAWINGS

The invention will now be described with reference to the accompanying drawings, in which.

DESCRIPTION OF EMBODIMENTS

Figure 1:
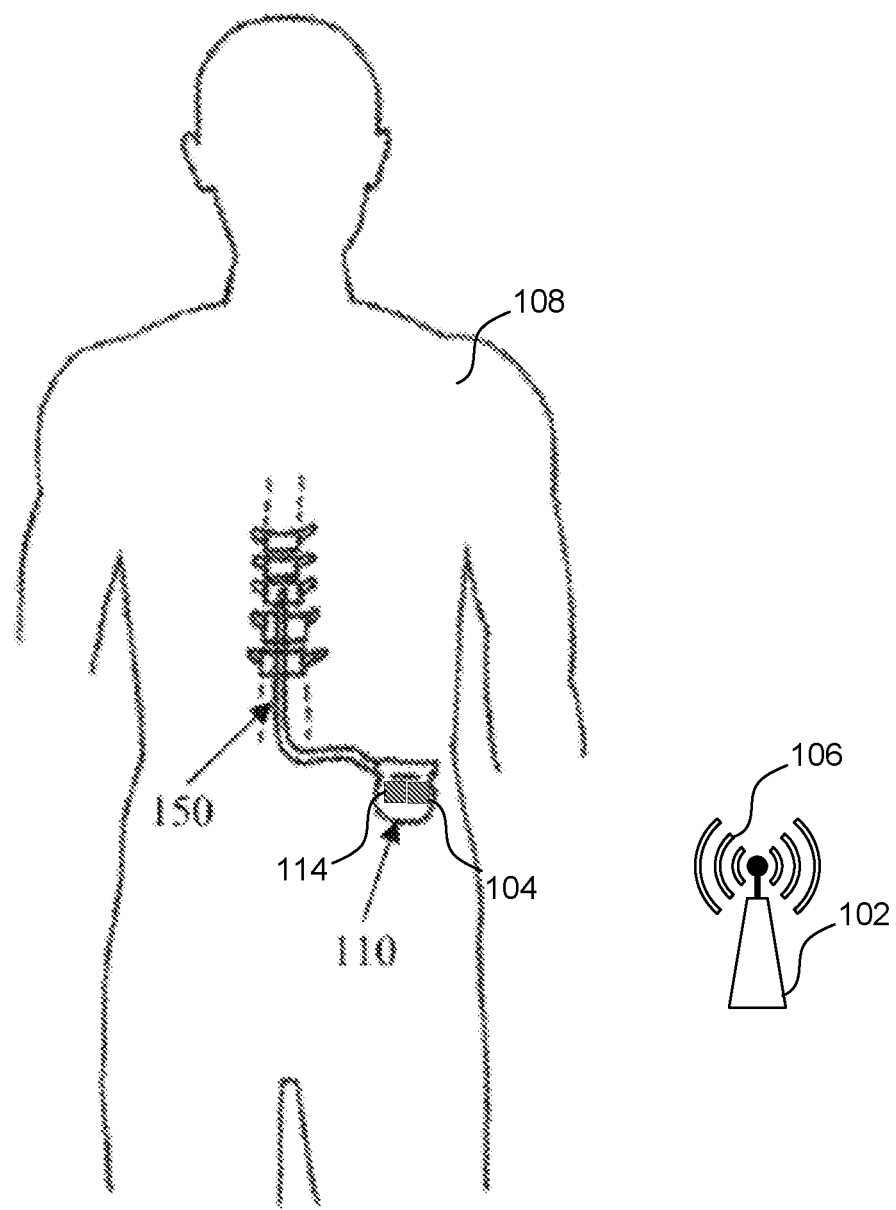
FIG. 1 schematically illustrates an implanted spinal cord stimulator in a patient, according to an embodiment.

FIG. 1—Implanted Spinal Cord Stimulator

FIG. 1 schematically illustrates an implanted spinal cord stimulator in a patient 108, according to an embodiment. The stimulator comprises an electronics module 110 implanted at a suitable location. In one embodiment, the electronics module 110 is implanted in the patient's lower abdominal area or posterior superior gluteal region. In other embodiments, the electronics module 110 is implanted in other locations, such as a flank or sub-clavicular. The stimulator further comprises an electrode assembly 150 implanted within the epidural space and connected to the module 110 by a suitable lead. The stimulator further comprises an energy storage device 104 and a telemetry module 114. The energy storage device 104 may be any suitable energy storage device such as a battery or capacitor. Telemetry module 114 transfers power and/or data between an external device 102 and other modules of device 110. For example, the energy storage device 104 may receive power from charger associated with the external device 102. The telemetry module 114 may utilise any suitable type of transcutaneous communication 106 such as infrared (IR) and electromagnetic including capacitive and inductive transfer, to communicate with the external device 102.

Figure 2:
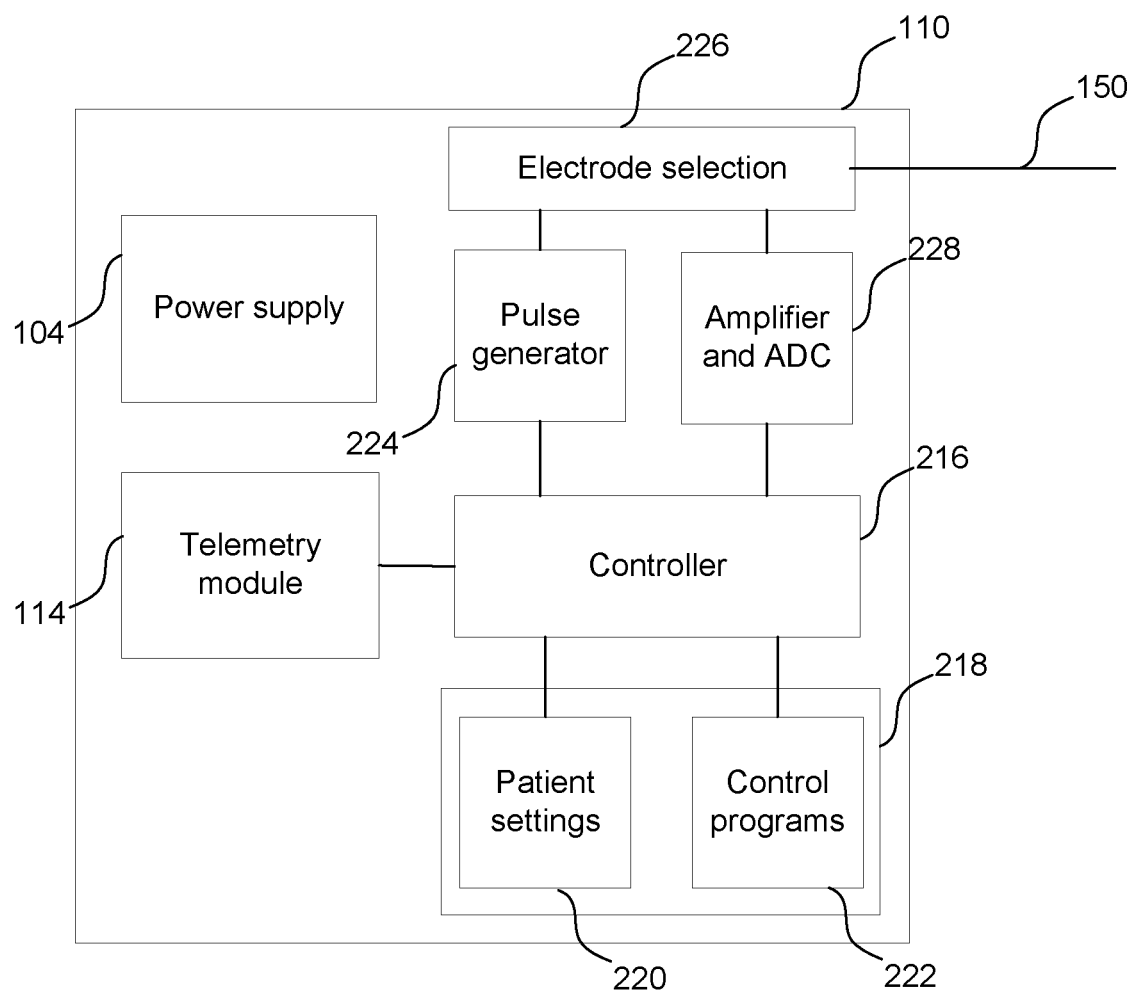
FIG. 2 is a block diagram of an implanted stimulator, according to an embodiment.

FIG. 2—Neurostimulator Block Diagram

FIG. 2 is a block diagram of the implanted electronics module 110, according to an embodiment. Module controller 216 has an associated memory 218 storing patient settings 220, control programs 222 and the like. Controller 216 controls a pulse generator 224 to generate stimuli, such as current pulses, in accordance with the patient settings 220 and control programs 222. Electrode selection module 226 switches the generated pulses to the appropriate electrode(s) of electrode array 150, for delivery of the current pulse to the tissue surrounding the selected electrode. Measurement circuitry 228 is configured to capture measurements of neural responses sensed at sense electrode(s) of the electrode array as selected by electrode selection module 226.

Stimuli Amplitude in Therapeutic Range

For effective and comfortable operation of an implantable neuromodulation device, it is desirable to maintain stimuli amplitude within a therapeutic range. A stimulus current within a therapeutic range evokes an ECAP value that is above a recruitment threshold and below a comfort threshold. A neural modulation device can adjust the applied stimulus current based on a feedback signal that is determined in light of the measured ECAP value, to keep the evoked response within this therapeutic range, and approximate to a target stimulation level. For example, the neural modulation device may calculate an error between a target ECAP value and a measured ECAP value and adjust the applied stimulus to reduce the error as much as possible, such as by adding the weighted error to the present stimulus intensity parameter. A neural modulation device that operates by adjusting the applied stimulus based on a measured ECAP value is said to be operating in closed loop mode and will also be referred to as a closed loop neural stimulus (CLNS) device.

Summary of a CLNS Feedback Loop

A closed loop neural stimulus (CLNS) device comprises a stimulator that takes a stimulus intensity parameter and converts it into a neural stimulus. The stimulus intensity parameter defines a stimulation pattern which produces an electrical pulse on stimulation electrodes. The stimulation pattern may define a stimulus current, a pulse width, alternating phase on/off, number of phases, number of stimulus electrode poles (bipolar, tripolar etc.), stimulus electrode position, stimulus to measurement distance and stimulus rate. The stimulation output by the stimulator has a summary value, usually the stimulus current, which is controlled by the feedback loop.

In an example CLNS system, the patient or clinician sets a target ECAP value at a desired stimulation level and the CLNS performs proportional-integral-differential (PID) control. In some examples, the differential contribution is disregarded and the CLNS system uses a first order integrating feedback loop. A clinician adjusts the gain value (proportional weight) K, to compensate for patient sensitivity. The stimulator produces stimulus in accordance with a stimulus intensity parameter, which produces an evoked ECAP response in the patient. The evoked response is detected and measured by the CLNS and compared to the target ECAP value.

The measured ECAP value, and its deviation from the target ECAP value, is used by the feedback loop to determine possible adjustments to the stimulus current to maintain an ECAP value at a given state to allow patients to receive consistent comfortable and therapeutic stimulation.

Figure 3:
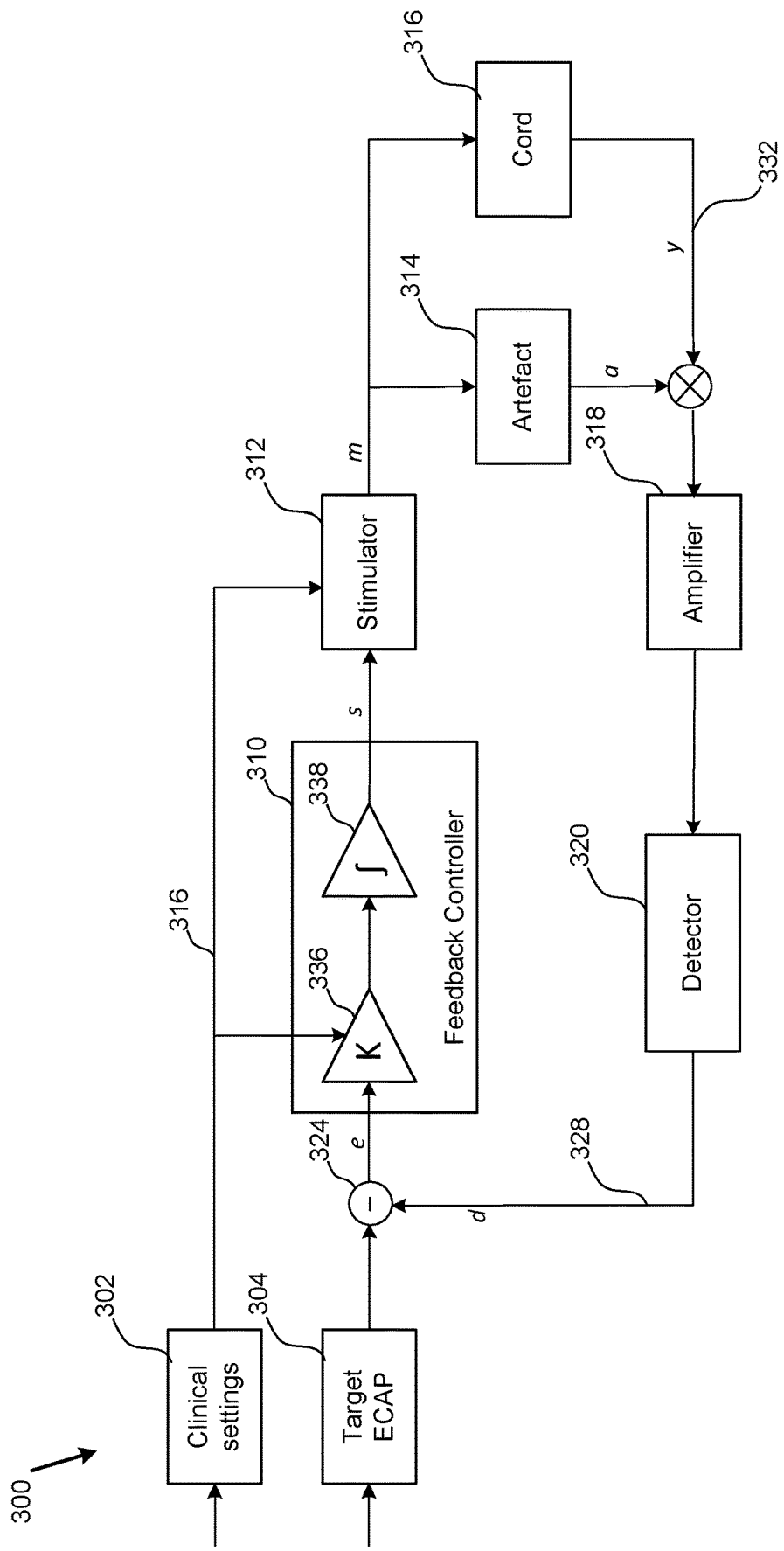
FIG. 3 is a system schematic illustrating elements of a feedback loop, for maintaining neural stimulation at a desired level, according to an embodiment.

FIG. 3—Closed Loop Pathway

FIG. 3 is a system schematic illustrating elements and inputs of a closed feedback loop, for maintaining neural recruitment at a target ECAP value, according to an embodiment. The system 300 comprises a stimulator 312 which takes a stimulus intensity parameter (also known as a stimulus current value) s, and converts it, in accordance with a set of stimulus parameters, to an electrical pulse on the stimulation electrodes (not shown). According to one embodiment, the stimulus parameters comprise alternating phase on/off, the number of phases, the number of stimulus electrode poles (bipolar, tripolar etc.), pulse width, stimulus electrode position, stimulus to measurement distance, stimulus rate. The stimulus output by the stimulator 312 thus has a summary value m, usually the pulse amplitude.

The stimulus crosses from the electrodes to the spinal cord 316; however, the neural recruitment arising from this is affected by mechanical changes, including posture changes, walking, breathing, heartbeat and so on. Mechanical changes may cause impedance changes, or changes in the distance and orientation of the nerve fibres. The stimulus also generates an evoked response y 332, which may be approximated by the equation $y=P(m-T)$ where T is the stimulus threshold and P is the slope of the response function. Various sources of noise n may add to the evoked response y before the response is measured, including (a) artefact 314, which is dependent on both stimulus current and posture; (b) electrical noise from external sources such as 50 Hz mains power; (c) electrical disturbances produced by the body such as neural responses evoked not by the device but by other causes such as peripheral sensory input, EGG, EMG; and (d) electrical noise from amplifiers 318.

The ECAP value of the evoked response provides a measure of the recruitment of the fibres being stimulated. The greater the stimulus, the more recruitment and larger the evoked response. An evoked response typically has a maximum ECAP value in the range of microvolts, whereas the applied stimulus to evoke the response is typically several volts.

Detector

The evoked response 332 is amplified by the signal amplifier 318 and then measured by the detector 320. The detector 320 outputs a measured response, d 328, comprising an ECAP value. The measured response 328 is then compared to the target ECAP value (set by target ECAP controller 304) by the comparator 324 to produce an error value, e. The error value, e, is input into the feedback loop controller 310.

The comparator 324 compares the ECAP value of the measured response signal to the target ECAP value as set by the target ECAP controller 304 and provides an indication of the difference between the ECAP value of the measured response signal and the target ECAP value to the feedback controller 310. This difference is the error value, e.

Feedback Controller

The feedback controller 310 calculates an adjusted stimulus intensity parameter, s, (which indicates the stimulus current) with the aim of achieving a measured response equal to the target ECAP value. Accordingly, the feedback controller 310 adjusts the stimulus intensity parameter, s, to minimise the error value, e. In a one embodiment, the controller 310 utilises a first order integrating feedback loop function, using a gain controller 336 and an integrator 338, in order to provide suitable feedback control to maintain constant paraesthesia/recruitment and/or maintain ECAP at a predefined level to allow patients to receive consistent comfortable and therapeutic stimulation.

A target ECAP value is input to the comparator 324 via the target ECAP controller 304. In one embodiment, the target ECAP controller 304 provides an indication of a specific target ECAP value. In another embodiment, the target ECAP controller 304 provides an indication to increase or to decrease the present target ECAP value. The target ECAP controller 304 may comprise an input into the neural stimulus device, via which the patient or clinician can input a target ECAP value, or indication thereof. The target ECAP controller 304 may comprise memory in which the target ECAP value is stored, and provided to the comparator 324.

A clinical settings controller 302 provides clinical parameters to the system, including the gain rate for the gain controller 336 and the stimulation parameters for the stimulator 312. The clinical settings controller 302 can be configured to adjust the gain value, K, of the gain controller 336 to compensate for patient sensitivity. The clinical settings controller 302 may comprise an input into the neural stimulus device, via which the patient or clinician can adjust the clinical settings. The clinical settings controller 302 may comprise memory, in which the clinical settings are stored, and are provided to components of the system 300.

Two clocks (not shown) are used in this embodiment, being a stimulus clock operating at ~60 Hz and a sample clock for measuring the evoked response operating at ~10 KHz. As the detector is linear, only the stimulus clock affects the dynamics of the feedback loop 300. On the next stimulus clock cycle, the stimulator 312 outputs stimulus parameters in accordance with the adjusted stimulus current value. Accordingly, there is a delay of one stimulus clock cycle before the stimulus parameters are updated in light of the error value e.

Figure 4:
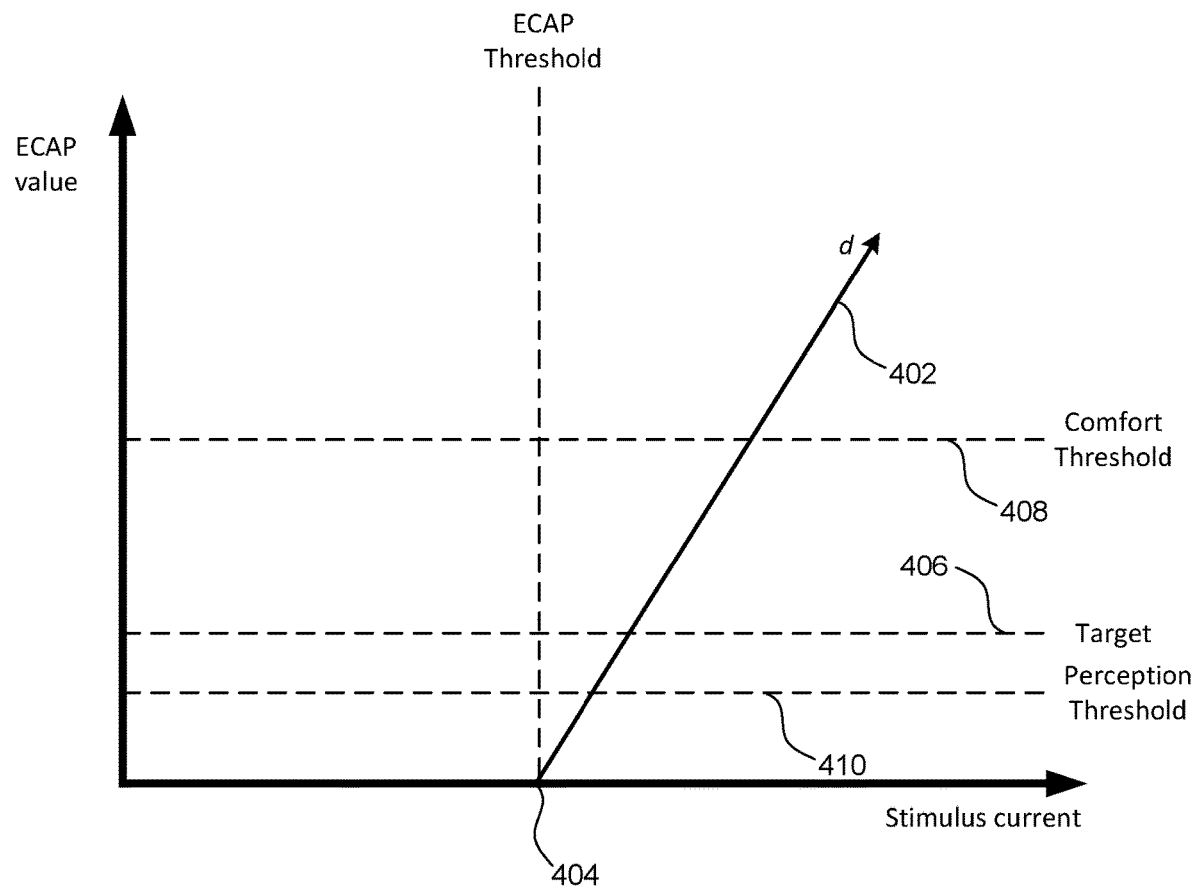
FIG. 4 is a graph illustrating an ECAP value profile of a measured response signal, according to an embodiment.

FIG. 4—ECAP Threshold

A profile graph is an approximation of the relationship between a range of stimulus current values and the measured ECAP values resulting from the stimulus current.

FIG. 4 illustrates an ECAP value profile 402 for a measured response signal, d, as output from the detector 320, according to one embodiment, for a range of stimulus current values and one posture of the patient. The ECAP response signal, as input into the detector 320, has a noise component. Accordingly, there is an ECAP threshold 404, indicated in terms of a stimulus current, below which the detector 320 cannot reliably distinguish the ECAP value from the noise component. The ECAP threshold 404 is a point on the ECAP profile, and may be referred to in terms of the ECAP value at the ECAP threshold, or the stimulus current value at the ECAP threshold. Defining the threshold in terms of the stimulus current has the advantage that the current stimulus current is directly available to the controller, while the ECAP value is subject to a noisy measurement. In one embodiment, the ECAP threshold is defined as the stimulus current at which the signal to noise ratio (SNR) of the measured response signal is greater than a SNR threshold. In one embodiment, the SNR threshold is 1. In one embodiment, the ECAP threshold is pre-set by clinical settings. In one embodiment, the ECAP threshold is experimentally set.

For ECAP values below the ECAP threshold 404, the detector 320 outputs an ECAP value of zero via the measured response signal, d 328.

Profile 402 has a zero ECAP value from the point at which the stimulus current is zero, until the ECAP threshold 404. From the ECAP threshold 404, the profile 402 has a positive slope indicating a linear relationship between stimulus current and the ECAP value of the measured response signal, d.

The measured response signal may also comprise an artefact component. An artefact component is not present in the embodiment illustrated in FIG. 4, but will be described in relation to other embodiments, below. If an artefact is adding a positive component to the measured ECAP value, the ECAP value corresponding to the ECAP threshold will have a positive value. Similarly, if an artefact is adding a negative component to the measured ECAP value, the ECAP value corresponding to the ECAP threshold will have a negative value.

Perception Threshold

FIG. 4 also illustrates an example comfort threshold 408, above which the patient experiences uncomfortable or painful stimulation, and an example perception threshold 410. The perception threshold corresponds to an evoked ECAP that is perceivable by the patient. There are a number of factors which can influence the position of the perception threshold with respect to the stimulus current, including the posture of the patient.

Perception threshold 410 may correspond to a stimulus current that is greater than the stimulus current corresponding to the ECAP threshold 404, as illustrated in FIG. 4, if the patient does not perceive low levels of neural activation. Conversely, the perception threshold may correspond to a stimulus current that is less than the stimulus current corresponding to the ECAP threshold 404, if the patient has a high perception sensitively to low levels of neural activation.

Furthermore, the stimulus current corresponding to the ECAP threshold 404 may be greater than the stimulus current corresponding to the perception threshold if the signal to noise ratio of the evoked response signal, input into the detector 320, is low.

Maintaining Stability at Low Target ECAP Values

Some patients find it beneficial to run the system to achieve an evoked response in which the stimulus current is equal to or below the stimulus current level at the ECAP threshold 404. Accordingly, some patients prefer to operate the device at a stimulus current that is at or below the ECAP threshold.

The feedback system illustrated in FIG. 3 detects an ECAP value that is greater than the noise level of the system. It can be difficult for a feedback controller to stabilise the feedback loop at a target ECAP value that is at or below the ECAP threshold, because the low signal to noise ratio at low ECAP values can result in an unreliable ECAP value for the measured response output from the detector.

Additionally, or alternatively, it can be difficult for a feedback controller to stabilise the feedback loop at a target ECAP value that is at or below the ECAP threshold, because the horizontal component of the ECAP profile from the origin to the ECAP threshold means that there is a range of stimulus current values which result in a measured ECAP value of zero.

In an attempt to stabilise the feedback loop at or below the ECAP threshold, the feedback loop may switch on and off in an unstable state, resulting in an uncomfortable or ineffective stimulation for the patient.

Additionally, when the patient coughs or changes posture quickly, the stimulation could cause an overstimulation, in the form of an ECAP value greater than the target ECAP value, or greater than the comfort threshold 408. Limiting the increase of the measured ECAP value during sudden movements, even when the target ECAP is near or under the ECAP threshold, can be beneficial.

Furthermore, an artefact can cause an offset in the measured response such that the ECAP value of the measured response is negative at the patient's preferred stimulation setting. This can lead to meta-stability in the feedback loop, as the feedback controller 310 increases the stimulus current to raise the detected ECAP value, but the resulting measured ECAP value exceeds the patient's target ECAP value. Meta-stability can be avoided by clipping negative ECAP values within the detector before outputting the measured response, d, but then some patients are unable to run the stimulation as low as they would like or need.

Accordingly, it is desirable to allow for a neural stimulation device to accommodate the preference of some patients to stabilise the stimulation at low ECAP values.

Hybrid Loop Concept

In order to ameliorate the abovementioned problems, this disclosure provides a hybrid loop system and method of operating the same. The hybrid loop functions in two modes; a closed loop control mode based on measured ECAP values and a direct current control mode. The hybrid loop switches between the two modes, the ECAP feedback mode and the current control mode, based on the value of the measured ECAP relative to a defined threshold (or plurality of thresholds) as set out below. The inclusion of a current control mode enables the patient to achieve stimulation at low ECAP values, such as stimulation below the ECAP threshold.

The hybrid loop operates within the current control mode by directly controlling the stimulator at a stimulus current level that is set by the patient, or by the clinical settings. Accordingly, in the current control mode, the stimulator is controlled directly at a target stimulus current level (also called a stimulus intensity level), rather than being controlled by a feedback loop. The current control mode enables the stimulator to achieve low or zero measured ECAP values, without introducing meta-stability within the feedback loop.

The hybrid loop switches to the ECAP feedback mode by activating a feedback loop which works to achieve stimulation at a target ECAP value, as set by the patient or the clinical settings. The detector measures the ECAP value resulting from the stimulus output from the stimulator, and adjusts the stimulus current in light of the difference between the measured ECAP value and the target ECAP value. In other words, the feedback loop seeks to minimise the error, e, between the target ECAP value and the measured ECAP value.

Figure 5:
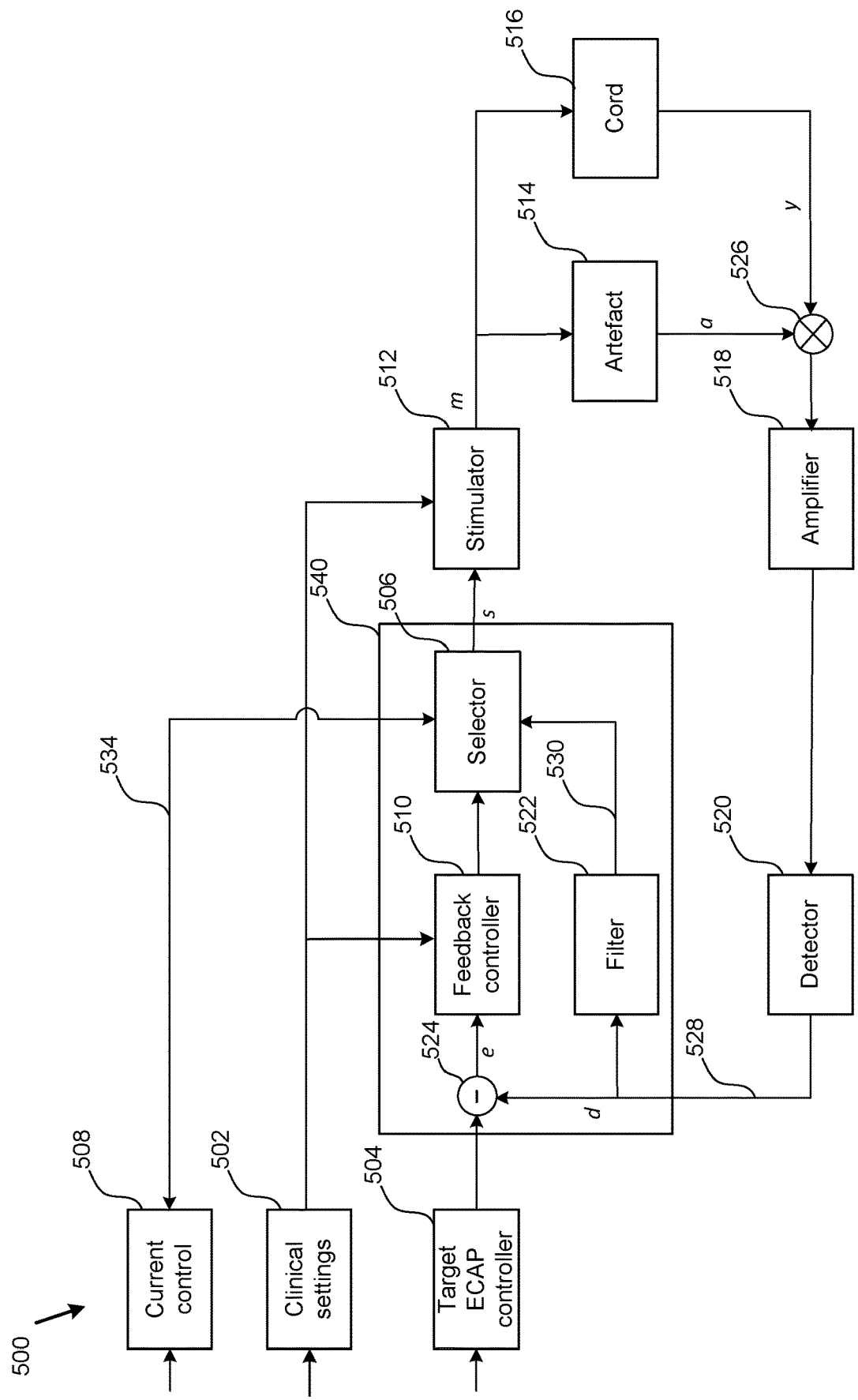
FIG. 5 is a system schematic illustrating elements a hybrid loop, for maintaining neural stimulation at a desired level, according to an embodiment.

FIG. 5—Hybrid Loop Pathway

FIG. 5 is a system schematic illustrating elements and inputs of a hybrid loop 500, for maintaining neural recruitment at a target ECAP value, according to an embodiment. The hybrid loop 500 comprises a stimulator 512 for generating stimulus current, an amplifier 518 for amplifying the measurable evoked response, a detector 520 for measuring the evoked response and a comparator 524 for comparing the measured response to a target value provided by the target controller 504. Each of these components of the hybrid loop 500 generally functions as described in relation to FIG. 3. The hybrid loop 500 comprises a filter 522, selector 506 and current controller 508, as described below. The hybrid loop 500 further comprises a controller 540, which comprises the filter 522, selector 506, comparator 524 and feedback controller 510. In some embodiments, the controller 540 further comprises the detector 520.

Filter

The controller 540 of the hybrid loop 500 includes a filter 522 configured to filter the measured response signal, d 528, and to produce a filtered response signal 530 (also called a response parameter). In one embodiment, the filter 522 calculates the rolling average of the measured response signal 528 over a period of time, or over a number of clock cycles. According to another embodiment, the filter 522 calculates a rolling mean of the measured response signal 528 over a set number of samples. In another embodiment, the filter 522 determines a weighted or cumulative form of the measured response signal 528. In yet another embodiment, the filter 522 passes through the measured response signal 528 to the filtered response 530 if the measured response signal 528 is within defined parameters. The filter 522 may use one or more different debouncing (or anti-jitter) techniques to determine a stabilised filtered response signal.

The clinical settings 502 can configure the function of the filter 522, specifying the filter function applied by the filter 522 to the measured response 528.

Selector

The controller 540 further comprises a selector 506. The selector 506 compares the filtered measured response signal 530 with one or more ECAP thresholds to determine whether to select control of the stimulator 512 by direct current control or to select control of the stimulator by feedback control. More specifically, the selector 506 determines whether the stimulator 512 receives a stimulus current value from the feedback controller 510, which controls the feedback loop component of the hybrid loop, or whether the stimulator 512 receives a stimulus current value from the current control input 508, which sets the current value for the direct current component of the hybrid loop.

A selector 506 may select between the feedback loop component or the direct current component of the hybrid loop in accordance with a variety of methods. In accordance with one embodiment, the selector 506 functions as a switch which is triggered by the filtered response signal 530 being above or below a set threshold. The threshold may be an ECAP threshold or a perception threshold, as set out below.

In accordance with another embodiment, the selector 506 operates as a hysteresis controller, which switches between the feedback control and the direct current control, to maintain a hysteresis over an upper and a lower threshold, as set out below.

Figure 6:
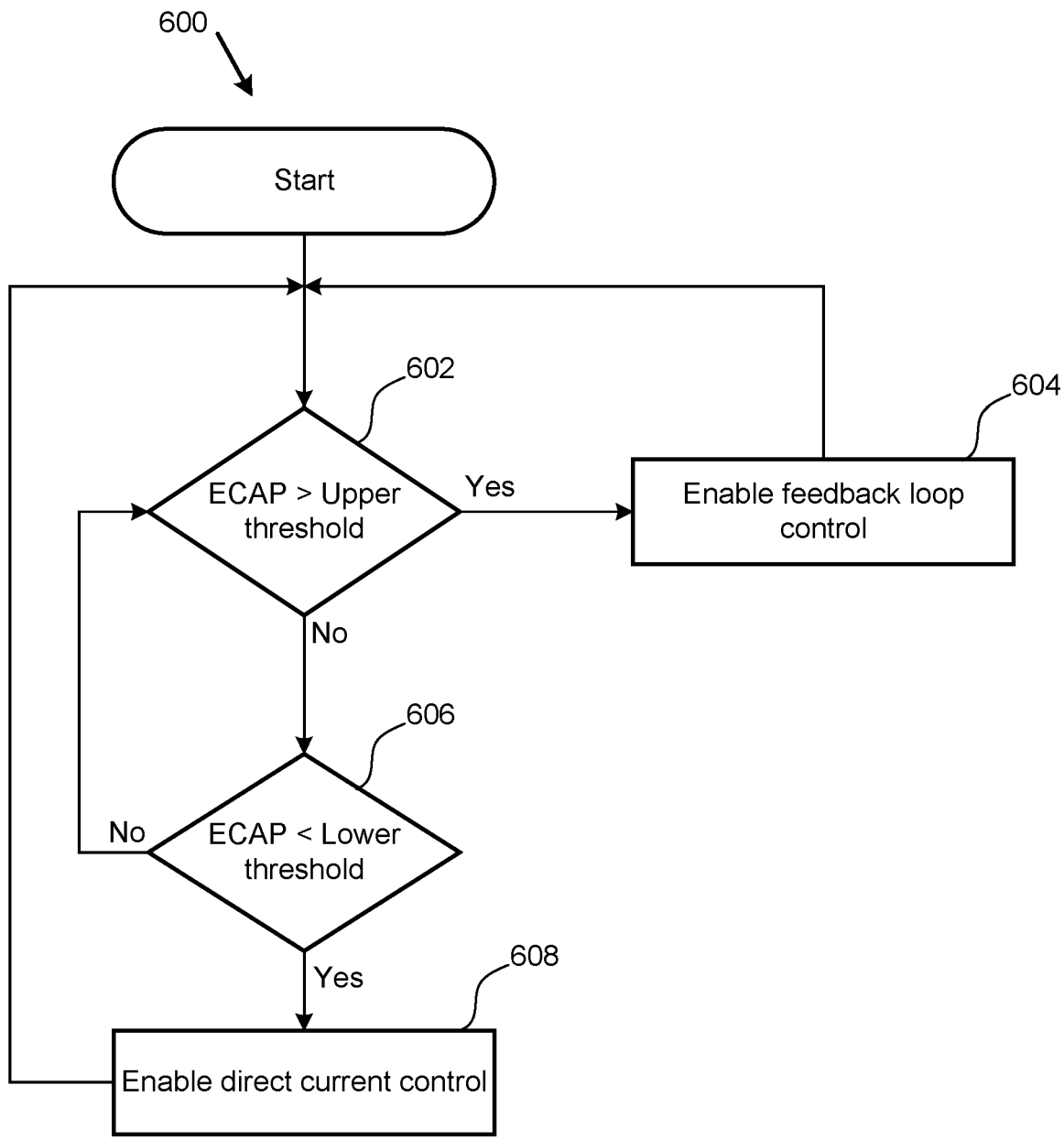
FIG. 6 is a flowchart illustrating hysteresis control of the hybrid loop of FIG. 5, according to an embodiment.

FIG. 6—Hybrid Loop as a Hysteresis

According to one embodiment, the selector is configured to operate the hybrid loop in accordance with an hysteresis function between an upper and a lower threshold. In one embodiment, the upper and lower thresholds are ECAP thresholds. In another embodiment, the lower threshold is a perception threshold. Hysteresis means that when the controller is in closed loop control, it uses the lower threshold to switch back to open loop control. Conversely, if the controller is in open loop control it uses the higher threshold to switch to closed loop control. This avoids rapid switching (or toggling) between both modes.

FIG. 6 is a flow chart illustrating the operation of the selector 506, according to an embodiment. The selector 506 selects direct current control or feedback control in accordance with a hysteresis function 600, operating over two threshold values.

The selector 506 determines 602 whether the ECAP value of the filtered response signal 530, as determined by the filter 522, is greater than an upper threshold. If the ECAP value of the filtered response signal 530 is greater than an upper threshold, then the selector enables 604 the feedback loop of the hybrid loop. Enabling the feedback loop comprises configuring the selector 506 to select stimulus control from the feedback controller 510.

If the ECAP value of the filtered response signal 530 is not greater than an upper threshold, the selector determines 606 whether the ECAP value of the filtered response signal 530 is less than a lower threshold. If the ECAP value of the filtered response signal 530 is not less than a lower threshold, the selector returns to the decision point 602, to determine whether the ECAP value of the filtered response signal 530 is greater than an upper threshold. In transitioning from decision point 602 to 606, or transitioning from decision point 606 to 602, the selector does not change the control of the hybrid loop. Accordingly, if the stimulator 512 is current controlled, it remains current controlled, or if the stimulator 512 is feedback controlled, it remains feedback controlled.

If, in decision point 606, the selector determines that the ECAP value of the filtered response signal 530 is less than the lower threshold, then the selector enables the direct current control of the stimulator 512 by the current control input 508.

The selector then returns to decision point 602, to determine whether the ECAP value of the filtered response signal 530 is greater than the upper threshold.

Hybrid Loop as a Switch

According to another embodiment, the first and the second thresholds are the same threshold, and the selector is configured to operate the selector 506 as a switch.

According to one embodiment, when the target ECAP value is set to zero, the hybrid loop operates in direct current control mode, in which the stimulator 512 is controlled by the current control input 508. As the target ECAP value is increased, for example by the patient adjusting the current control input 508, the current control input 508 will increase the stimulus intensity parameter, s, until the ECAP value of the filtered response signal 530 reaches an ECAP threshold. Once the ECAP value of the filtered response signal 530 reaches the ECAP threshold the selector 506 controls the stimulator via the feedback controller 510.

When turning stimulation down, while the stimulator 512 is being controlled by the feedback controller 510, and the ECAP threshold is reached, the selector 506 switches control of the stimulator 512 to the current control input 508.

Switching to Direct Current Control Mode

In one embodiment, when the selector 506 switches to direct current control mode from feedback mode, the stimulus current is set, initially, to the stimulus current last used during direct current control. In one embodiment, when the selector 506 switches to direct current control more from feedback mode, the stimulus current is set, initially, to the stimulus current at the previous sample clock cycle.

In one embodiment, the selector 506 further comprises non-volatile memory which stores an indication of the stimulus current value. This memory is updated each time the feedback controller calculates a new output signal to maintain a store of the most recently used stimulus current value, or an indication thereof, such as a time-windowed average stimulus current. When the selector 506 switches control from the feedback controller 510 to the current control input 508, the selector 506 sets the stimulus current to the most recently used stimulus current value, as stored in the memory. This avoids the stimulus current value jumping from the last used stimulus current value set by the feedback controller 510 to a potentially disparate stimulus current level output by the current control input. Accordingly, this enables the patient to experience a smooth transition from feedback control to direct current control.

Alternatively, the hybrid loop 500 may include bi-directional communication between the selector 506 and the current control input 508 to periodically, such as on each stimulus clock cycle, provide the stimulus current value to the current control input 508. Accordingly, when the selector 506 switches control from the feedback controller 510 to the current control input 508, the current control input can initially set the stimulus current value to last used stimulus current value. The current control input 508 can subsequently ramp the stimulus current value up or down to achieve a target stimulus current value. The target stimulus current value is a stimulus intensity level desired by the patient or the clinician.

In one embodiment, when the hybrid loop 500 is switched on from an inactive state, the initial or default mode of the hybrid loop is configured to be the direct current control mode. Accordingly, the stimulator 512 receives stimulus current levels from the current control input 508.

When the patient selects to increase the stimulation level, the current control input provides a signal to the stimulator 512, via the selector 506 to increase the stimulus current, until the stimulus current reaches a pre-programmed sub-threshold level, or until the ECAP value of the measured response signal, as output from the detector 520, exceeds the ECAP threshold. When the measured ECAP value reaches the ECAP threshold, the selector 506 switches the hybrid loop into closed loop feedback mode.

When the hybrid loop is in feedback mode, further input from the patient to increase the stimulation level is processed by the target ECAP controller 504 as a request to increase the target ECAP value.

Control Inputs

The hybrid loop 500 comprises a current control input 508. In one embodiment, the current control input 508 provides a signal to the selector 506 indicating whether to increase or decrease the stimulus current. In another embodiment, the current control input 508 provides a signal to the selector 506 indicating a target stimulus current value.

The current control input 508 may comprise an interface, controllable by a patient or a clinician, via which the patient or clinician can select a target stimulus current value (or representation thereof), or select to increase or decrease the present stimulus current value. The target stimulus current value is a stimulus intensity level, of the stimulus, desired by the patient or the clinician.

The hybrid loop 500 further comprises a target ECAP controller 504. In one embodiment, the target ECAP controller 504 provides a signal to the feedback controller 510 indicating whether to increase or decrease the target ECAP value. In another embodiment, the target ECAP controller 504 provides a signal to the feedback controller 510 indicating a particular target ECAP value. The target ECAP controller 504 may comprise an interface, controllable by a patient or a clinician, via which the patient or clinician can select a target ECAP value (or representation thereof), or select to increase or decrease the present ECAP value.

In one embodiment, the current control input 508 and the target ECAP controller 504 comprise a combined unit, in which the patient or clinician can select a target ECAP value (or representation thereof), or select to increase or decrease the present stimulus intensity level. The combined unit may comprise an up/down control to allow the patient to signal a command to increment or decrement the stimulus current, when the hybrid loop is in current control mode, or to increment or decrement the target ECAP value when the hybrid loop is in feedback mode.

Controlling Current

As the selector 506 receives an increase signal from the current control input 508, the selector 506 increases the stimulus current, s. Similarly, as the selector 506 receives a decrease signal from the current control input 508, the selector 506 decreases the stimulus current, s. In one embodiment, the rate or step of the increase or decrease of the stimulus current is configurable, e.g. via the clinical settings 502, or may be set within the selector 506.

Set to Last Used Target or Current

In one embodiment, the selector 506 further comprises non-volatile memory which stores an indication of whether the hybrid loop 500 is in current control mode or ECAP feedback mode, and either an indication of the most recent stimulus current value or the target ECAP value, respectively.

Accordingly, if the hybrid loop 500 was in current control mode at the time of being turned off, the non-volatile memory would store the last stimulus current value provided to the electrodes. Accordingly, upon turning on the system, the selector 506 can set the stimulus current to the last used stimulus current value prior to turning off the system. Advantageously, this eliminates the need for the patient or clinician to increment the stimulus current up to the last used value from zero.

Ramp Up to ECAP Threshold

In one embodiment, the selector 506 is configured to operate the hybrid loop 500 in the direct current control mode until the measured ECAP value of the filtered response signal reaches the target ECAP value, then the hybrid loop is configured to switch to the feedback loop control with the aim of maintaining the ECAP value of the filtered response signal at the target ECAP value.

On start-up, the ECAP value of the filtered response signal is zero. The hybrid loop is configured to gradually increase the current, within the current control mode, until the ECAP value of the filtered response signal reaches the target ECAP value. The rate of gradual increase may be configurable by the clinical settings, and may depend upon the value of the target ECAP value, the settings of the selector or other factors.

Figure 7:
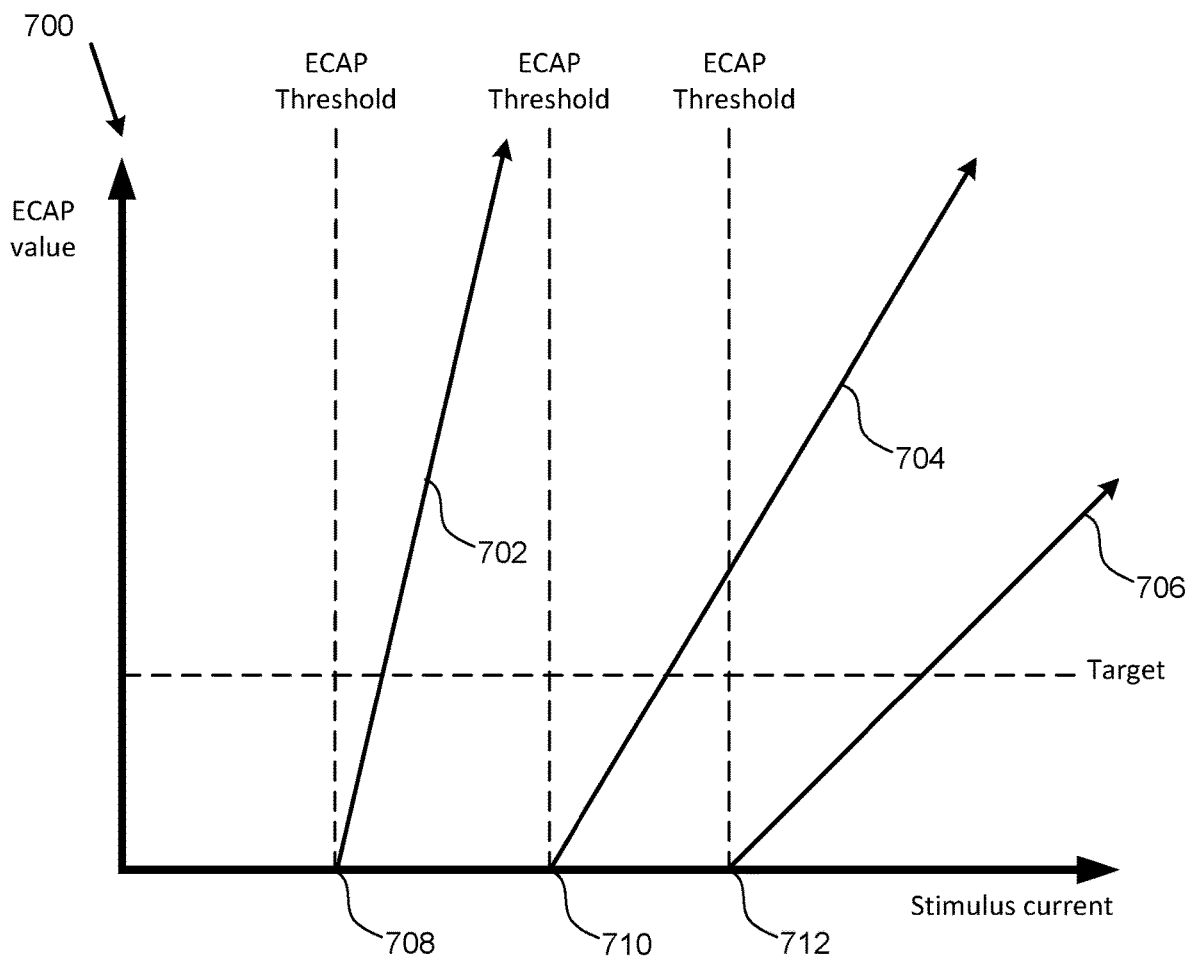
FIG. 7 is a graph illustrating the linear approximations of three ECAP value profiles of three measured response signals, corresponding to three different postures of a patient, according to an embodiment.

FIG. 7—Posture Changes

FIG. 7 illustrates the variation in the gradients of the profiles of the response signal with changing posture of the patient. A change in posture of the patient may cause a change in impedance of the electrode-tissue interface or a change in the distance between electrodes and the neurons. While the profiles for only three postures, 702, 704 and 706, are shown in FIG. 7, the profile for any given posture can lie between or outside the profiles shown, on a continuously varying basis depending on posture. In one embodiment, as the patient's posture changes, the stimulus current at ECAP threshold changes, as indicated by the ECAP thresholds 708, 710 and 712. Additionally, as the patient's posture changes, the gradient of the response profile also changes, as indicated by the gradients of profiles 702, 704 and 706.

While the hybrid loop 500 is in current control mode, if the patient moves into a less sensitive posture, causing the neural recruitment to decrease, then the measured ECAP value will decrease. If the patient moves into a more sensitive posture, causing the neural recruitment to increase, the measured ECAP value will increase. The increase and decrease of the measured ECAP value during posture changes may trigger the hybrid loop to switch between current control mode and feedback mode. For example, if the hybrid loop 500 is in current control mode and a posture change causes the measured ECAP value to increase above a first threshold, then the selector 506 selects control of the stimulator 512 by feedback control. Conversely, if the hybrid loop 500 is in feedback control mode and a posture change causes the measured ECAP value to decrease below a second threshold, then the selector 506 selects control of the stimulator 512 by current control. In one embodiment, the first threshold and the second threshold are the same threshold.

FIG. 8—Artefacts

In some embodiments, a signal comprising an artefact component is generated within the neural tissue. The profile of the artefact component may be dependent on the stimulus current, impedance at the electrode tissue and/or the posture of the patient. In general, artefacts are signals detected by the electrodes that are not generated by the neural tissue. So artefacts are not part of the ECAP. Instead, artefacts are measurements of the stimulation pulses themselves after they are applied to the neural tissue. Depending on the implementation of the stimulation device, these artefacts can cause an error in the measured ECAP value as they are difficult to distinguish from the ECAP value.

Figure 8:
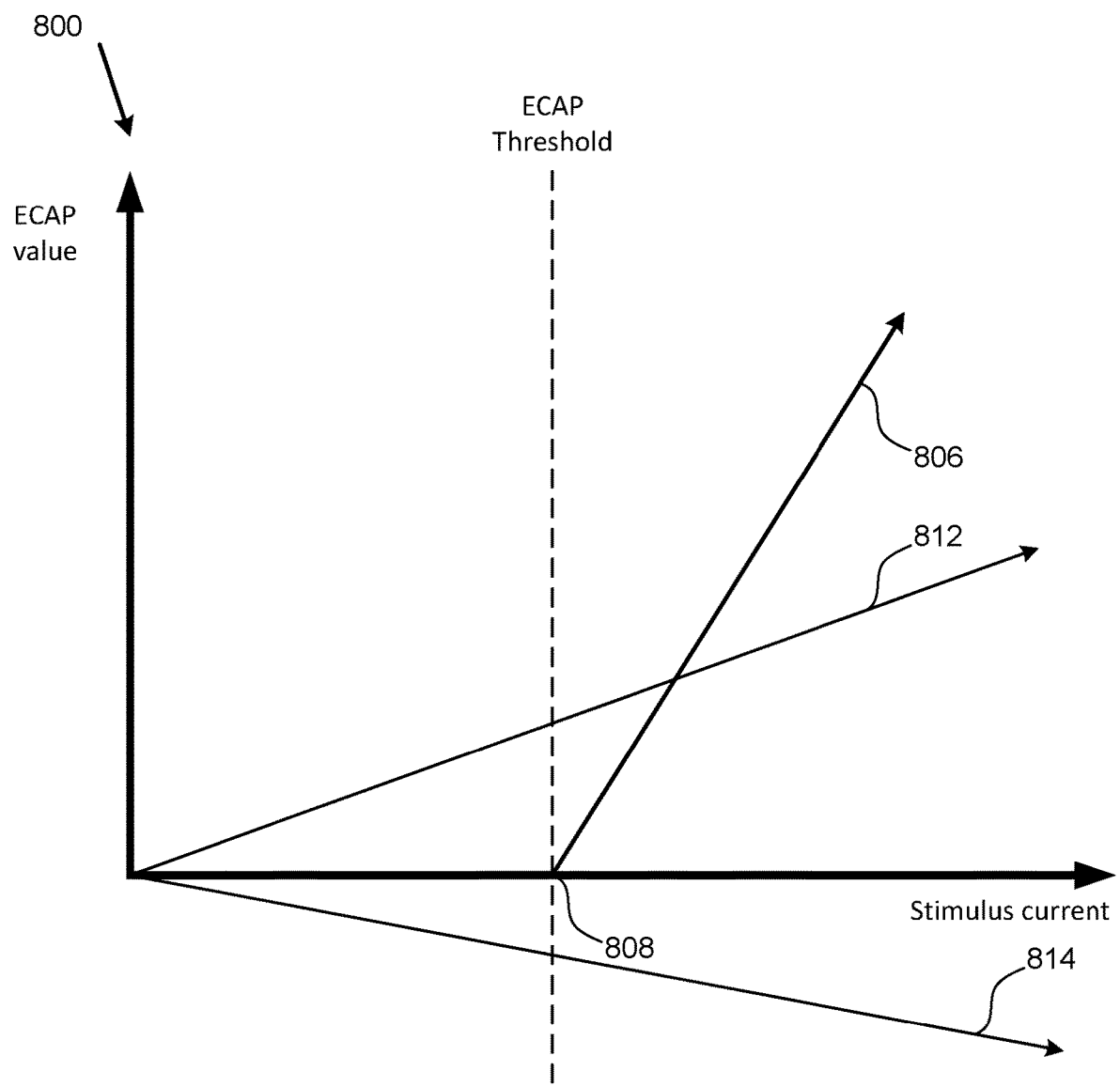
FIG. 8 is a graph illustrating the profile of linear approximations of artefact components of a measured response signal, according to an embodiment.

FIG. 8 illustrates profiles of example artefact components generated in response to a neural stimulus signal with the profile 806. In one embodiment, the artefact component has a voltage or amplitude profile that is approximately linear with respect to the stimulus current. The artefact component may have a negative gradient, as illustrated by profile 814, or a positive gradient, as illustrated by profile 812. The gradient of the artefact profile may depend on the posture of the patient.

When an artefact component is present, the measured response signal output by the ECAP detector 520 is a combination of the artefact component and the evoked response signal. Accordingly, the signal output by the detector 520 will be a combination of a signal that is proportional to the stimulus current and a signal that is proportional to actual ECAP value. In one embodiment, the profile of the artefact component is determined by determining a partial profile based on the measured ECAP response signal at stimulus current values from zero to the ECAP threshold. The slope of the partial profile may be extrapolated to provide a linear approximation of the artefact component with respect to the stimulus current value. A fixed offset component of the artefact component may be determined by measuring the ECAP response when the stimulus current is zero. A plurality of profiles for the artefact component may be determined at a plurality of different postures of the patient. In one embodiment, a combined artefact component profile is determined by applying a function to the plurality of determined artefact component profiles to average or otherwise combine the plurality of determined artefact component profiles.

Figure 9:
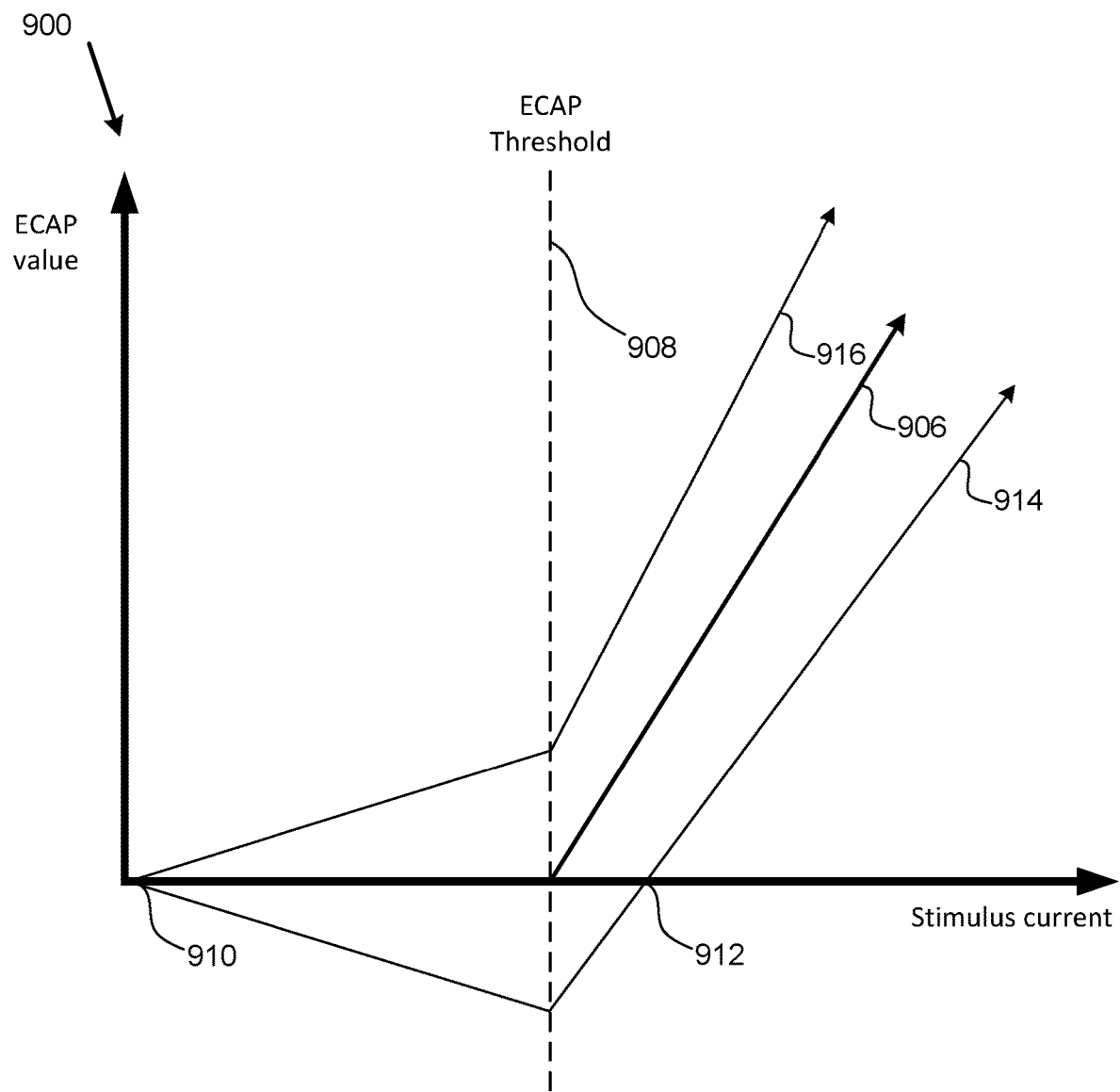
FIG. 9 is a graph illustrating an ECAP value profile of a measured response signal incorporating artefact compensation, according to an embodiment.

FIG. 9—ECAP Affected by Artefact

FIG. 9 illustrates the profiles of measured response signals 528 output by the ECAP detector 520 for situations in which the artefact components 812 and 814 are each, separately, combined with the evoked response signal 806. Profile 916 illustrates the profile of measured response signal, d 528, as output by the detector 520, when artefact 812 is present. The presence of artefact 812 raises the profile, such that there is a positive ECAP value at the ECAP threshold 908.

Profile 914 illustrates the profile of measured response, d, as output by the detector 520, when artefact 814 is present. When the artefact has a negative gradient, the profile slopes downward such that there is a negative ECAP value at the ECAP threshold 908. In this situation, the feedback loop can be bistable, which means that there are two stimulus current values, 910 and 912, that can produce a zero-valued measured response, d, as output from the detector 520. This can lead to meta-stability in the ECAP feedback loop as controlled by the feedback controller 510.

Meta-stability can be avoided by clipping negative values in the detector output, but then some patients are unable to run stimulation as low as they would like or need to achieve therapeutic benefit. Accordingly, the selector 506 can be configured to provide direct current control of the stimulator 512 when the ECAP value is below zero, to compensate for the presence of an artefact in the measured response signal.

Figure 10:
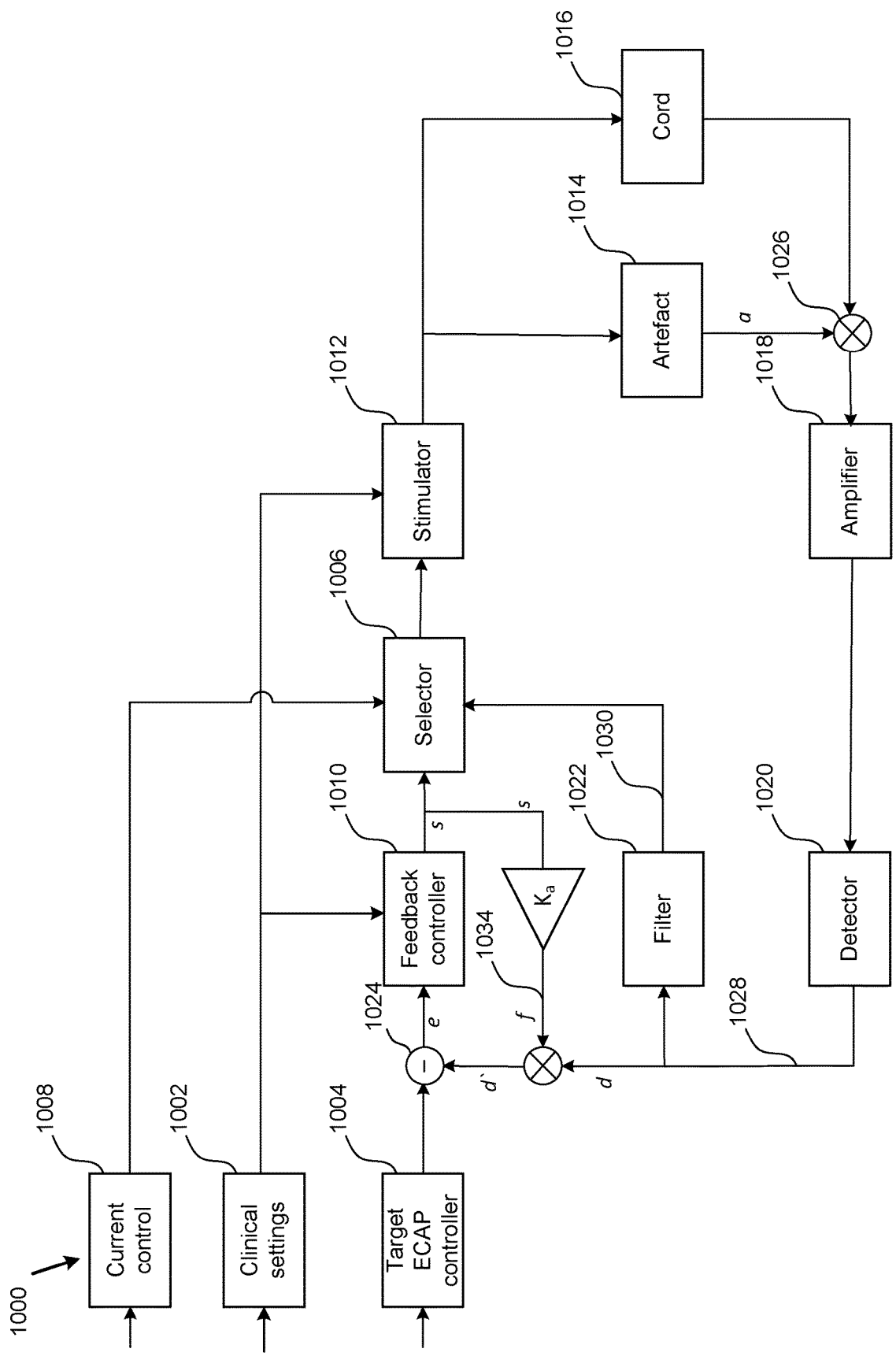
FIG. 10 is a system schematic illustrating elements a hybrid loop incorporating artefact compensation, for maintaining neural stimulation at a desired level, according to an embodiment.

FIG. 10—Hybrid Loop with Artefact Compensation

An artefact may be compensated for by the application of a forward adjustment parameter, also known as an artefact compensation parameter, f, that negates the artefact signal, as exemplified by the embodiment illustrated in FIG. 10. FIG. 10 illustrates a hybrid loop in which the feedback controller 1010 adds an artefact compensation parameter, f 1034, to the measured response d, to compensate for an artefact, a. The artefact compensation parameter, f 1034, is proportional to the stimulus current, s, and is of opposite sign and equivalent magnitude to the determined artefact, a. The artefact compensation parameter can be adjusted by use of a factor $K_a$, which is the negative of the gain rate between the stimulus waveform and the detector output.

The measured response, d, is added to the artefact compensation parameter, f, to produce an adjusted response signal. The artefact compensation parameter, f, is a signal of the opposite sign to the artefact and similar constant of proportionality. Accordingly, the artefact compensation parameter nullifies the effect of the artefact component, and the adjusted response represents the measured response without the artefact component. In one embodiment, the artefact compensation parameter is in the form of a signal. In one embodiment, the artefact compensation parameter is a digital value.

Figure 11:
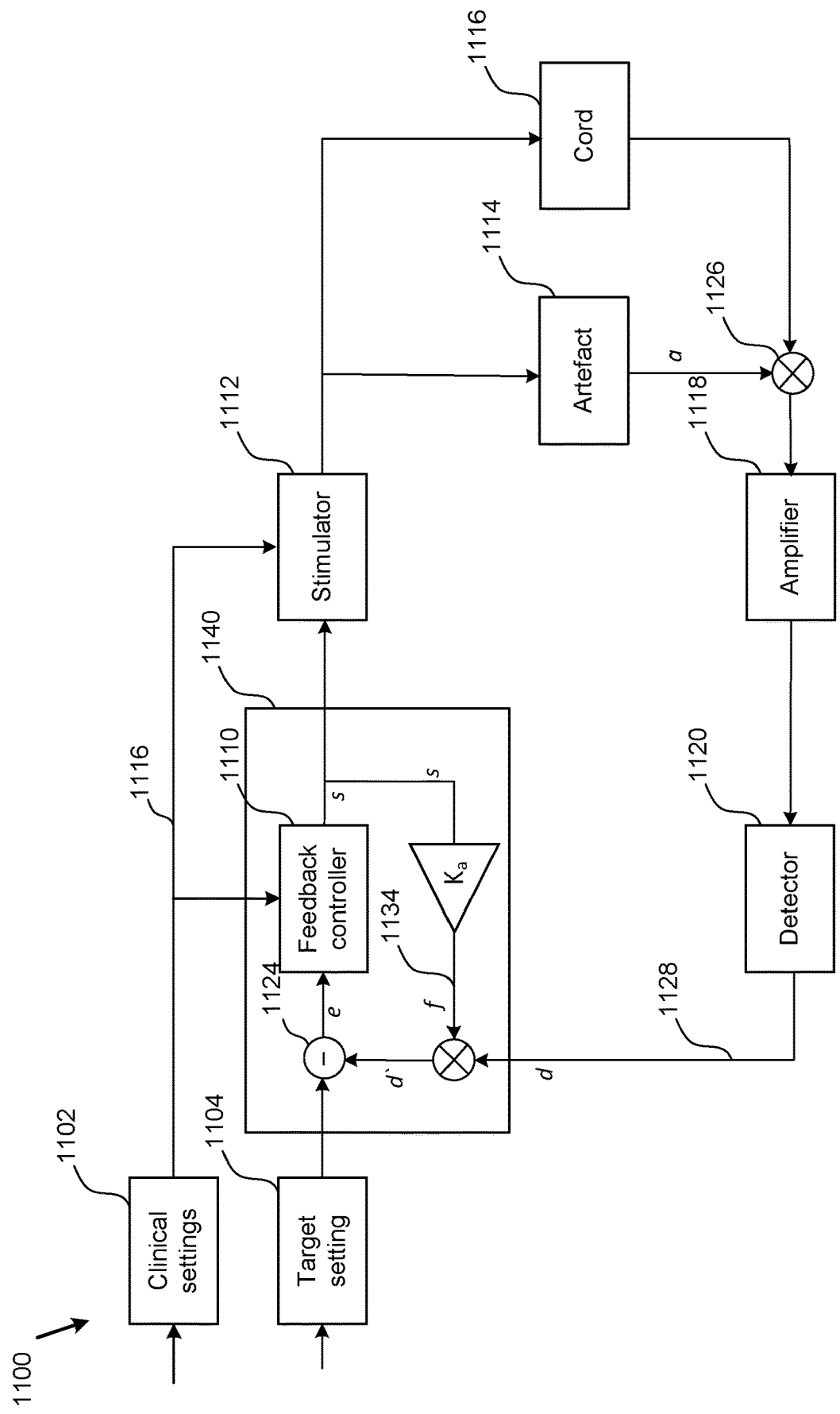
FIG. 11 is a system schematic illustrating elements of a feedback loop incorporating artefact compensation, for maintaining neural stimulation at a desired level, according to an embodiment.

FIG. 11—Feedback Loop with Artefact Compensation

FIG. 11 illustrates a feedback loop 1100 of a neural stimulation system, according to an embodiment. The feedback loop 1100 is not a hybrid loop. That is, it does not include a component for direct control of the stimulus current. The feedback loop 1100 comprises a controller 1140. The controller 1140 comprises a comparator 1124, a feedback controller 1110, and an artefact compensation parameter 1134. In some embodiments, the controller 1140 further comprises a detector 1120.

The feedback controller 1110 adds an artefact compensation parameter f 1134 to the measured response, d 1128, to compensate for an artefact, a. The artefact compensation parameter, f 1134, is proportional to the stimulus current, s, and is of opposite sign and equivalent magnitude to the determined artefact, a. As noted above, in relation to the embodiment illustrated in FIG. 10, the artefact compensation parameter can be adjusted by use of a factor $K_a$, which is the negative of the gain rate between the stimulus waveform and the detector output.

Fixed Offset Component

In one embodiment, the artefact compensation parameter includes a fixed offset to compensate for a component of the artefact that is constant rather than being current dependent. In such an embodiment, the artefact compensation parameter, f, is of the form $f=s \cdot K_a+y$, where y is the artefact when the stimulus current is 0 mA.

Dual Gain Rates

The gain rate, K, defines the rate at which the stimulus current, s, is increased or decreased by the feedback controller (e.g. 310) as the aims to achieve a zero valued error, e. The gain rate may be expressed as a percentage or multiplier of the measured ECAP value. The negation of the gain rate, also known as the loss rate (or reduction rate), is used by the feedback controller to decrease the stimulus current.

Depending on a patient's therapeutic needs it may be advantageous to configure the feedback controller such that the gain rate differs in magnitude from the loss rate (reduction rate). For example, if the target ECAP value is close to the comfort threshold for a patient, it may be desirable to increases the stimulus current slowly up to the target ECAP value to reduce the risk of overshooting the target ECAP value. Furthermore, it may be desirable to decrease the stimulus current quickly if the stimulus current exceeds the target ECAP value. In another example, if the target ECAP value is close to the patient's perception threshold, it may be desirable to increase the stimulus current quickly if it falls below the target ECAP value, but decrease the stimulus current at a slower rate if the measured ECAP value rises above the target ECAP value.

In one embodiment, the feedback controller increases the stimulus current in accordance with a gain rate, and decreases the stimulus current in accordance with a loss rate that is different from the gain rate. In one embodiment, the gain rate and/or the loss rate are configurable via the clinical settings.

Figure 12:
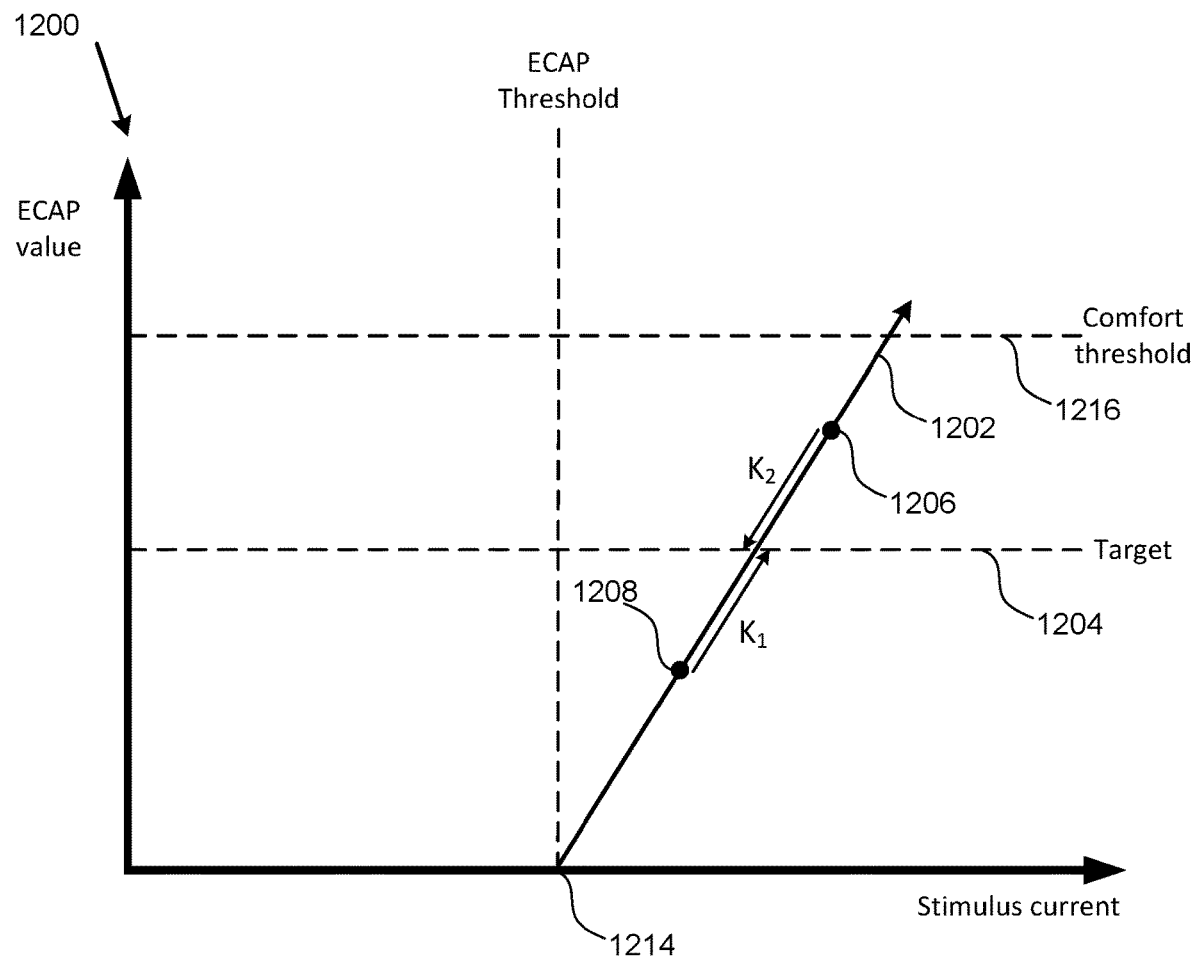
FIG. 12 illustrates dual gain rates associated with an ECAP value profile of a measured response signal, for one posture of the patient, according to an embodiment.

FIG. 12—Dual Gain Example

FIG. 12 illustrates the ECAP profile 1202 of a measured response signal, as output from a detector, for one posture of a patient, according to an embodiment. The ECAP value of a measured response signal, d, will fall along the profile 1202, depending upon the stimulus current used to evoke the ECAP response. The feedback controller sets the target ECAP 1204 to an ECAP value according to parameters set by the patient or the clinical settings.

The comparator 524 compares the ECAP value of the measured response signal, d, to the target ECAP value 1204 to provide an indication of the difference in ECAP value to the feedback controller 510.

If the ECAP value of the measured response signal, d, is below the target ECAP value 1204, for example, the measured ECAP value is at point 1208, the feedback controller increases the stimulus current at a rate set by gain rate $K_1$. The gain rate may also be determined as a function of the duration of the time for which the measured ECAP value was below the target. This function may be determined with the integrator. In some embodiments, the gain rate is determined as a function of the difference between the ECAP value of the measured (or adjusted) response signal and the target ECAP value. For example, the feedback controller 630 may increase the gain if the ECAP value of the measured (or adjusted) response signal is far below the target ECAP value.

If the ECAP value of the measured response signal exceeds the target ECAP value, for example, the measured ECAP value is at point 1206, then the feedback controller reduces the stimulus current at a rate determined by loss rate $K_2$. The reduction rate (or loss rate) may also be determined as a function of the duration of the time for which the measured ECAP value exceeds the target. This function may be determined with the integrator. In some embodiments, the loss rate $K_2$ is determined as a function of the difference between the ECAP value of the measured (or adjusted) response signal and the target ECAP value.

In one embodiment, the target ECAP value 1204, the gain rate and the loss rate are adjusted by a clinician. The target ECAP value can be set at or below the patient's maximum comfort threshold 1216.

Figure 13:
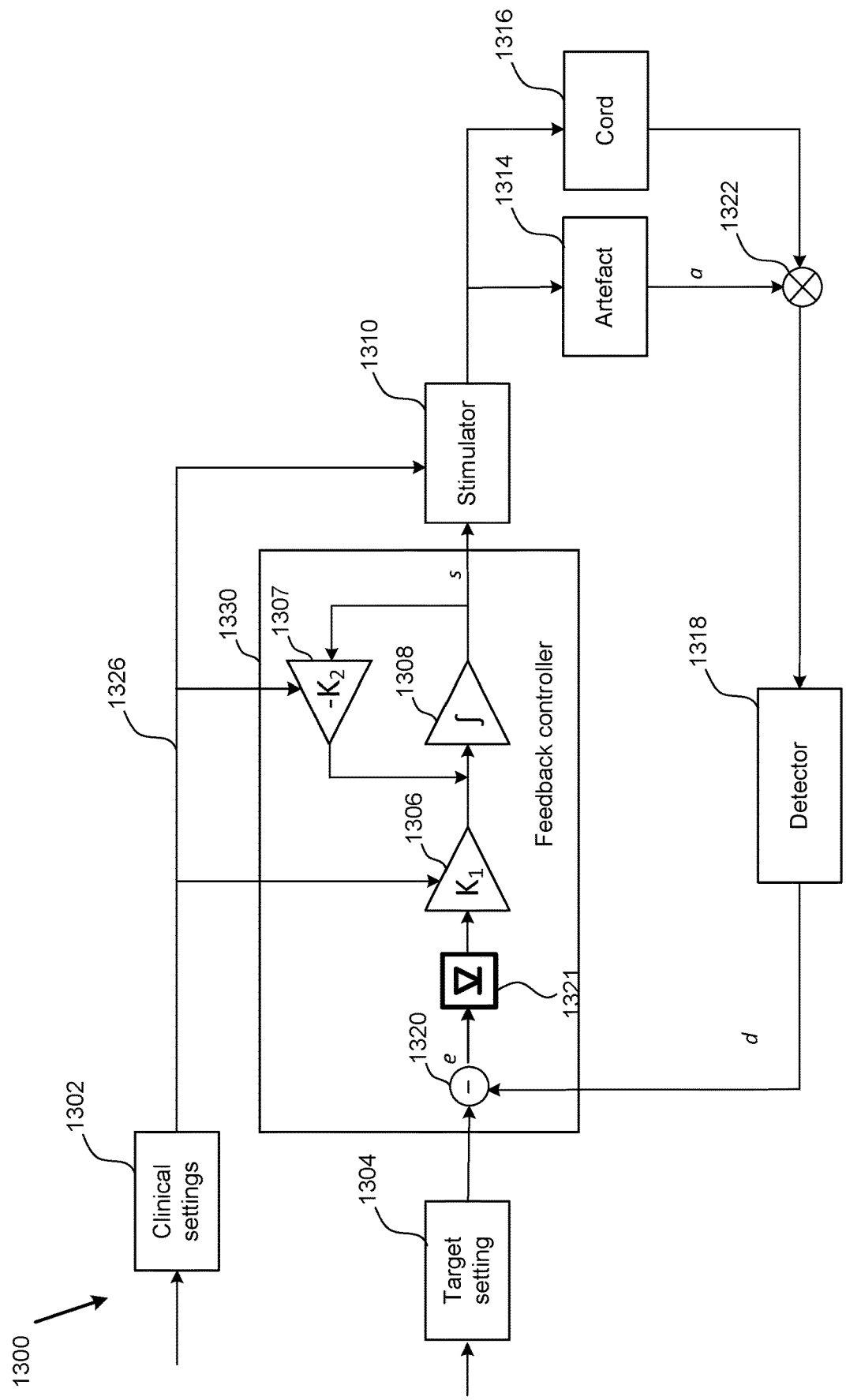
FIG. 13 is a system schematic illustrating elements of a feedback loop incorporating dual gain rates, for maintaining neural stimulation at a desired level, according to an embodiment.

FIG. 13—Dual Gain Pathway

FIG. 13 illustrates a feedback loop 1300 of a neural stimulation system, according to an embodiment. The feedback loop 1300 is not a hybrid loop. That is, it does not include a component for direct control of the stimulus current. Rather the feedback loop 1300 comprises a target setting input 1304 via which the patient or clinician provides input indicative of the target ECAP value for the system.

The evoked response signal is detected by the detector 1318 and output to the comparator 1320, as measured response signal, d. The comparator 1320 compares the ECAP value of the measured response signal to the target ECAP value set by the target setting input 1304 and provides an indication of the difference to the feedback controller 1330. The feedback controller 1330 comprises a gain unit 1306 to increase the stimulus current in accordance with the gain rate $K_1$ if the difference is positive, as determined by the rectifier 1321, i.e. the ECAP value is less than the target ECAP value. If the difference is negative, i.e. the ECAP value is greater than the target ECAP value, the rectifier 1321 does not pass the difference along, and instead the stimulus current reduces to bring the ECAP value back to the target ECAP value at a rate set by a loss rate $K_2$ of the reduction unit 1307 included in the integrator 1308.

Figure 14:
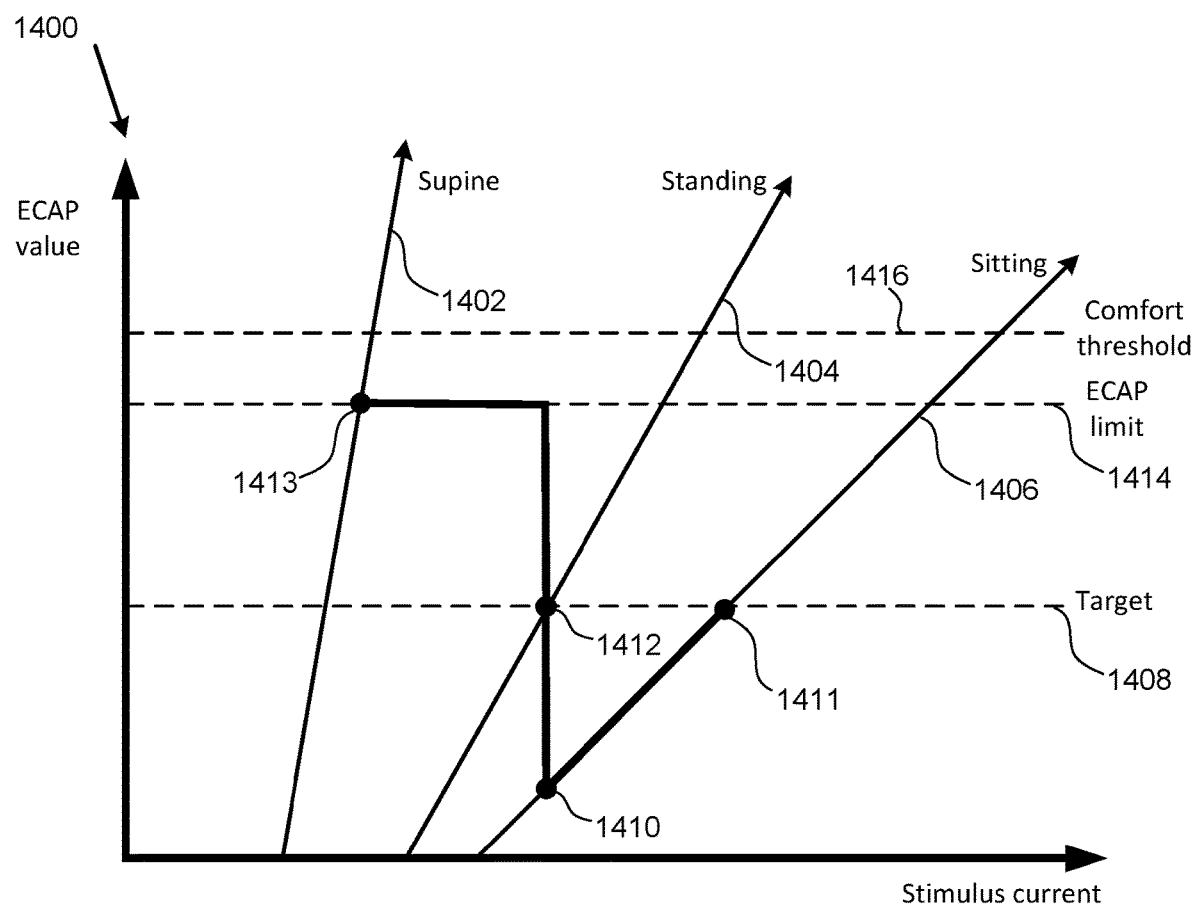
FIG. 14 is a graph illustrating operational states through which a stimulation system passes during posture changes of a patient, according to an embodiment.

FIG. 14—System States

The measured ECAP value and stimulus current values at which the selector 506 switches from current control mode to ECAP feedback mode depend on the posture of the patient. FIG. 14 shows the states a hybrid loop system will follow, under normal operation, according to an embodiment. More specifically, FIG. 14 illustrates three example profiles, for the ECAP value of a measured response signal, for three postures. Profile 1402 is an example profile when the patient is in a supine position, profile 1404 is an example profile when the patient is in a standing posture, and profile 1406 is an example profile when the patient is in a sitting posture.

In the example illustrated in FIG. 14, the system has been set, by the patient or the clinician, to the target ECAP value 1408 in standing posture. The patient is at set point 1412. As the patient changes posture from standing to sitting, the ECAP value of the measured response decreases to point 1410. As the patient remains in the sitting posture, the feedback controller will increase the stimulus current to move the system along the sitting profile 1406, back to the target ECAP value 1408, ending at set point 1411.

When the patient is in the standing posture, and the system is at the target ECAP value, at position 1412, if the patient moves to a supine position, then the ECAP value of the measured response increases sharply, up to the ECAP limit 1414. Then the feedback controller rapidly decreases the stimulus current to reach the set point 1413. This keeps the ECAP value at, or below, the ECAP limit 1414, and prevents the ECAP value reaching the comfort threshold 1416.

Figure 15:
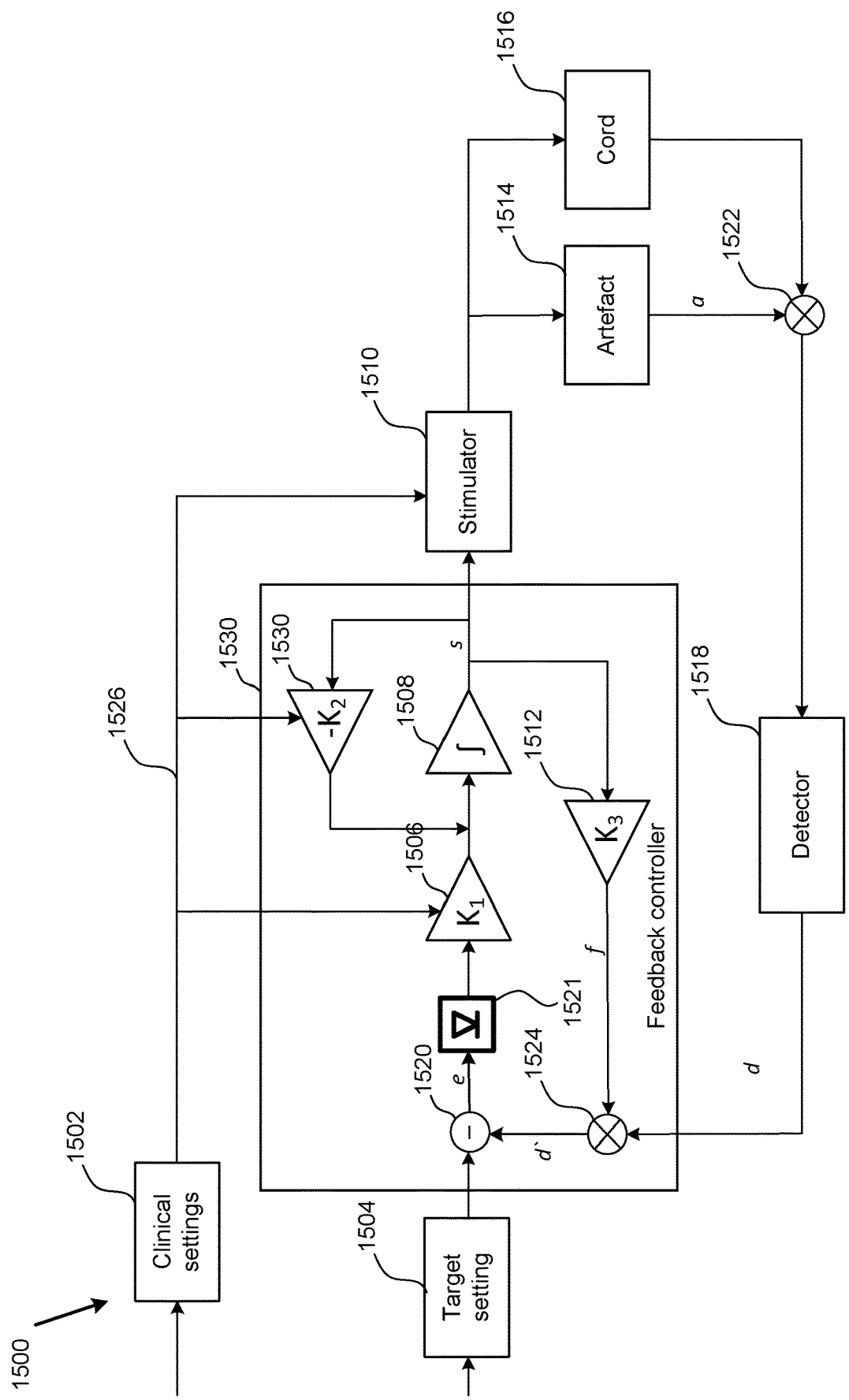
FIG. 15 is a system schematic illustrating elements of a hybrid loop incorporating dual gain rates, for maintaining neural stimulation at a desired level, according to an embodiment.

FIG. 15—Dual Gain with Artefact Compensation

FIG. 15 illustrates a feedback loop 1500 of a neural stimulation system, according to an embodiment. Feedback loop 1500 comprises a feedback controller 1530 configured to provide a stimulus current reduction in accordance with loss rate $K_2$, and stimulus current gain in accordance with gain rate $K_1$. Feedback controller 1500 is further configured to provide artefact compensation via the gain rate $K_3$ 1512.

Methods Performed by the Feedback Controller

Figure 16:
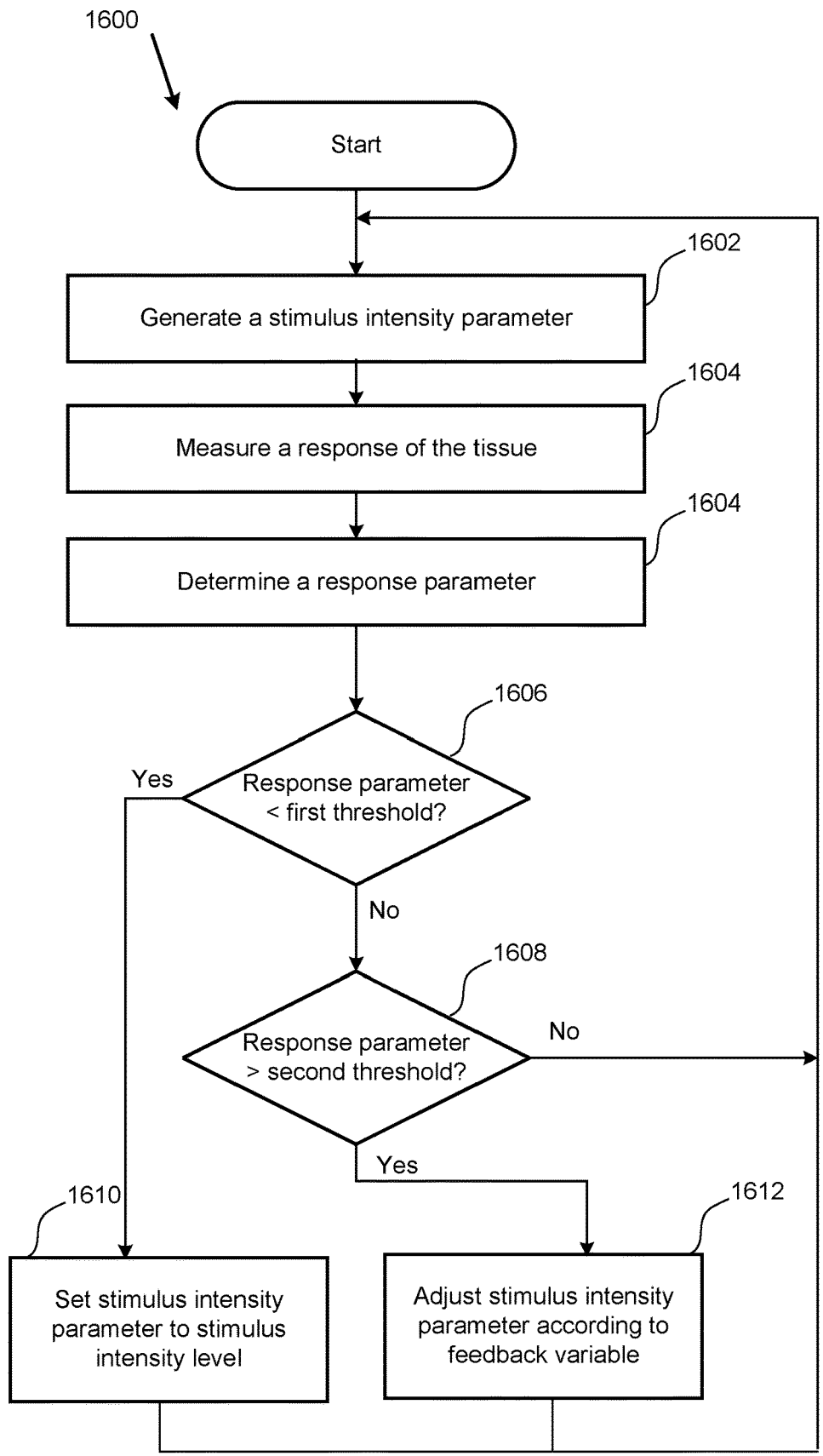
FIG. 16 illustrates a method of controlling a neural stimulus as described with reference to FIGS. 5 and 6, according to an embodiment.

FIG. 16 illustrates a method 1600 of controlling a neural stimulus as described with reference to FIGS. 5 and 6, according to an embodiment. The neural stimulus is defined by at least one stimulus intensity parameter. The method is performed by the controller 540 in that the controller 540 generates 1602 a stimulus intensity parameter to control a stimulator that generates a stimulus current for application to a tissue. The controller 540 then measures 1604 a response of the tissue, evoked by the stimulus current. As explained above, the controller 540 further determines 1604 a response parameter indicative of the measured response. In response to the response parameter being less than a first threshold 1606, the controller 540 sets 1610 the stimulus intensity parameter to a desired stimulus intensity level. In response to the response parameter being greater than a second threshold 1608, the controller 540 adjusts 1612 the stimulus intensity parameter according to a feedback variable derived from the measured response.

Figure 17:
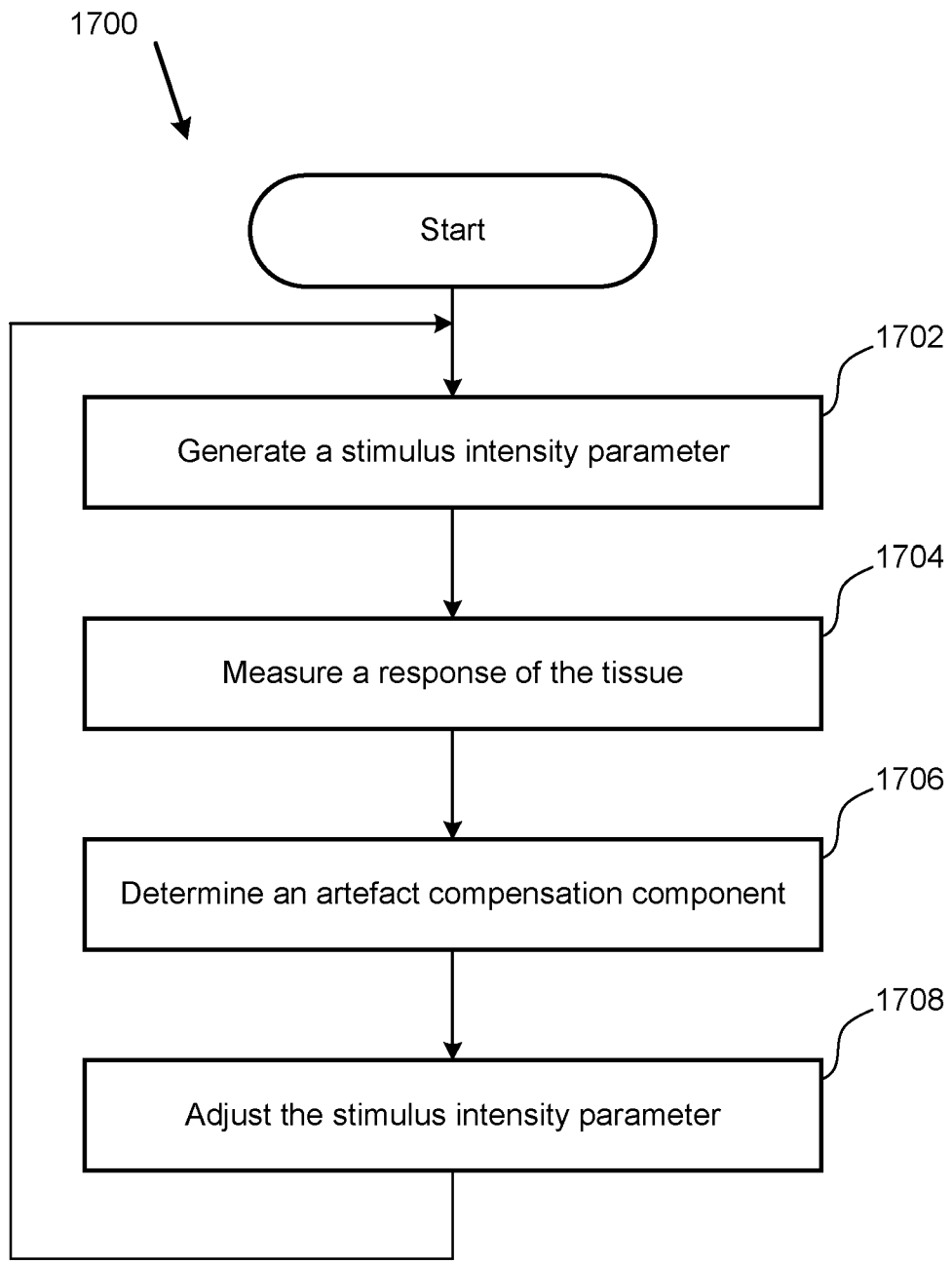
FIG. 17 illustrates a method of controlling a neural stimulus as described with reference to FIGS. 11, according to an embodiment.

FIG. 17 illustrates a method 1700 of controlling a neural stimulus as described with reference to FIGS. 11, according to an embodiment. The neural stimulus is defined by at least one stimulus intensity parameter. The method is performed by the controller 1140 in that the controller 1140 generates 1702 a stimulus intensity parameter to control a stimulator that generates a stimulus current for application to a tissue. The controller 1140 then measures 1704 a response of the tissue, evoked by the stimulus current. As explained above, the controller 1140 further determines 1706 an artefact compensation component as a function of the stimulus intensity parameter and indicative of an artefact component of the measured response. Finally, the controller 1140 adjusts 1708 the stimulus intensity parameter according to a feedback parameter derived from the measured response and the artefact compensation component.

Figure 18:
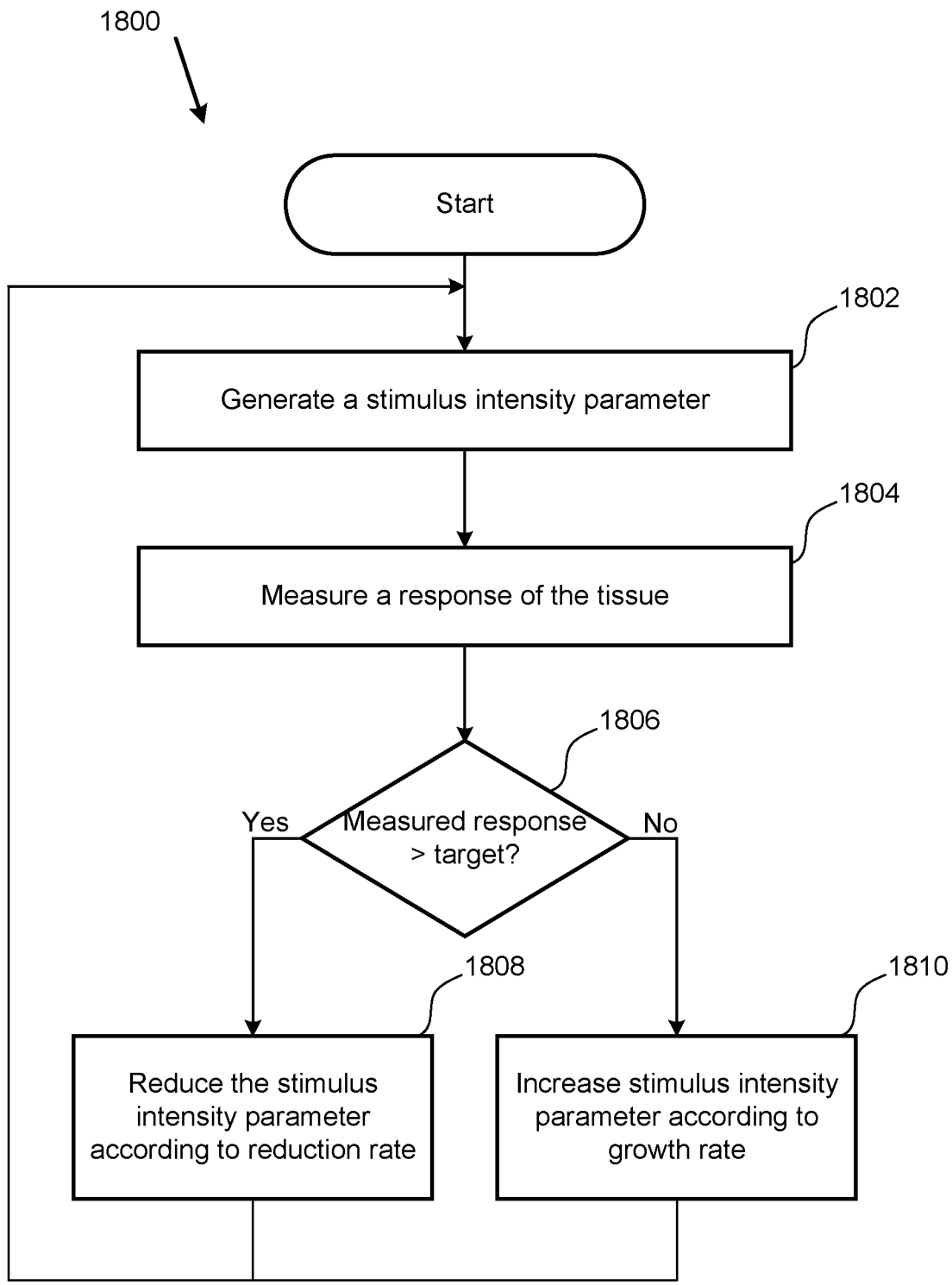
FIG. 18 illustrates a method of controlling a neural stimulus as described with reference to FIGS. 12 and 13, according to an embodiment.

FIG. 18 illustrates a method 1800 of controlling a neural stimulus as described with reference to FIGS. 12 and 13, according to an embodiment. The neural stimulus is defined by at least one stimulus intensity parameter. The method is performed by the feedback controller 1330 in that the feedback controller 1330 generates 1802 a stimulus intensity parameter to control a stimulator that generates a stimulus current for application to a tissue. The feedback controller 1330 then measures 1804 a response of the tissue, evoked by the stimulus current. As explained above, in response to the measured response being greater than a target value 1806, the feedback controller 1330 reduces 1808 the stimulus intensity parameter in accordance with a reduction rate. Further, in response to the measured response being less than a target value, the feedback controller 1330 increases 1810 the stimulus intensity parameter in accordance with a growth rate. A magnitude of the reduction rate is not equal to a magnitude of the growth rate.

It will be appreciated by persons skilled in the art that numerous variations and/or modifications may be made to the above-described embodiments, without departing from the broad general scope of the present disclosure. Furthermore, it will be appreciated by persons skilled in the art that embodiments disclosed herein can be combined with one or more other embodiment disclosed herein, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The invention claimed is:

1. A method of controlling a neural stimulus, the neural stimulus being defined by at least one stimulus intensity parameter, the method comprising:
    generating a stimulus intensity parameter to control a stimulator that generates a stimulus for application to a tissue,
    measuring a response of the tissue, evoked by the stimulus;
    determining a response parameter indicative of the measured response;
    in response to the response parameter being less than a first threshold, setting the stimulus intensity parameter to a desired stimulus intensity level that is independent of the measured response; and
    in response to the response parameter being greater than a second threshold, adjusting the stimulus intensity parameter according to a feedback variable derived from the measured response.

2. The method of claim 1, wherein the desired stimulus intensity level is configured by a user.

3. The method of claim 1, wherein setting the stimulus intensity parameter to the desired stimulus intensity level comprises determining a present stimulus intensity parameter of the neural stimulus and setting the stimulus intensity level to the present stimulus intensity parameter.

4. The method of claim 1, wherein setting the stimulus intensity parameter to the desired stimulus intensity level comprises iteratively adjusting the stimulus intensity parameter to the desired stimulus intensity level in increments.

5. The method of claim 1, wherein the first threshold is equal to the second threshold.

6. The method of claim 1, wherein the first threshold and the second threshold represent a level of electrically evoked compound action potential of the tissue.

7. The method of claim 1, wherein the first threshold and the second threshold are determined based on the stimulus intensity level at an ECAP threshold.

8. The method of claim 1, wherein the response parameter is a function of a plurality of measured response values determined over a time period.

9. The method of claim 1, further comprising storing the stimulus intensity parameter in non-volatile memory, and in response to the neural stimulus turning on, setting the stimulus intensity parameter to the stored stimulus intensity parameter.

10. The method of claim 1, further comprising:
determining an artefact compensation parameter based on an artefact component of the measured response of the tissue; and
adjusting the measured response based on the artefact compensation parameter.

11. The method of claim 10, further comprising determining the artefact component based on the stimulus intensity parameter.

12. The method of claim 1, wherein adjusting the stimulus intensity parameter according to the feedback variable derived from the measured response comprises:
in response to the measured response being greater than a target value, reducing the stimulus intensity parameter in accordance with a loss rate; and
in response to the measured response being less than the target value, increasing the stimulus intensity parameter in accordance with a gain rate.

13. The method of claim 12, wherein the magnitude of the loss rate is not equal to the magnitude of the gain rate.

14. The method of claim 12, further comprising determining the loss rate based on a duration of time for which the measured response is greater than the target value.

15. The method of claim 1, wherein the first threshold is determined based on a perception threshold of the tissue.

16. The method of claim 1, wherein the second threshold is determined based on a perception threshold of the tissue.

17. An implantable device for controllably applying a neural stimulus defined by at least one stimulus intensity parameter, the device comprising:
one or more stimulus electrodes to deliver stimulus to a tissue to evoke a compound action potential response of the tissue;
a stimulator for controlling the one or more stimulus electrodes in accordance with the at least one stimulus intensity parameter;
measurement circuitry for measuring the evoked compound action potential response of the tissue; and
a control unit configured to,
generate the stimulus intensity parameter,
measure the response of the tissue, evoked by the stimulus,
determine a response parameter indicative of the measured response,
in response to the response parameter being less than a first threshold, set the stimulus intensity parameter to a desired stimulus intensity level that is independent of the measured response, and
in response to the response parameter being greater than a second threshold, adjust the stimulus intensity parameter according to a feedback parameter derived from the measured response.

18. The device of claim 17, further comprising an input for configuring the desired stimulus intensity level.

19. The device of claim 17, wherein the control unit is configured to set the stimulus intensity parameter to the desired stimulus intensity level by determining a present stimulus intensity parameter of the neural stimulus and setting the stimulus intensity level to the present stimulus intensity parameter.

20. The device of claim 17, wherein the control unit is configured to set the stimulus intensity parameter to the desired stimulus intensity level by adjusting the stimulus intensity parameter to the desired stimulus intensity level in increments.

21. The device of claim 17, wherein the first threshold is equal to the second threshold.

22. The device of claim 17, wherein the first threshold and the second threshold represent a level of electrically evoked compound action potential of the tissue.

23. The device of claim 17, wherein the first threshold is determined based on a perception threshold of the tissue.

24. The device of claim 17, wherein the second threshold is determined based on a perception threshold of the tissue.

* * * * *